(12) United States Patent
Monaco et al.

(10) Patent No.: US 6,314,402 B1
(45) Date of Patent: Nov. 6, 2001

(54) METHOD AND APPARATUS FOR CREATING MODIFIABLE AND COMBINABLE SPEECH OBJECTS FOR ACQUIRING INFORMATION FROM A SPEAKER IN AN INTERACTIVE VOICE RESPONSE SYSTEM

(75) Inventors: Peter C. Monaco, Mt. View; Steven C. Ehrlich, Burlingame; Debajit Ghosh, Sunnyvale; Mark Klenk, Campbell; Julian Sinai; Madhavan Thirumalai, both of Palo Alto; Sundeep Gupta, Sunnyvale, all of CA (US)

(73) Assignee: Nuance Communications, Menlo Park, CA (US)

( * ) Notice: Subject to any disclaimer, the term of this patent is extended or adjusted under 35 U.S.C. 154(b) by 0 days.

(21) Appl. No.: 09/296,191

(22) Filed: Apr. 23, 1999

(51) Int. Cl.$^7$ .................................................... G10L 15/22
(52) U.S. Cl. .......................... 704/275; 704/270; 704/272
(58) Field of Search ................................... 704/270, 272, 704/278

(56) References Cited

U.S. PATENT DOCUMENTS

| | | | | |
|---|---|---|---|---|
| 5,794,204 | * | 8/1998 | Miyazawa et al. | 704/275 |
| 5,842,168 | * | 11/1998 | Miyazawa et al. | 704/275 |
| 5,899,972 | * | 5/1999 | Miyazawa et al. | 704/249 |
| 5,940,793 | * | 8/1999 | Attwater et al. | 704/231 |
| 5,946,658 | * | 8/1999 | Miyazawa et al. | 704/275 |
| 5,995,918 | * | 11/1999 | Kendall et al. | 704/1 |
| 6,044,347 | * | 3/2000 | Abella et al. | 704/272 |
| 6,094,635 | * | 7/2000 | Scholz et al. | 704/270 |
| 6,173,266 | | 1/2001 | Marx et al. . | |

FOREIGN PATENT DOCUMENTS

0903922A2   3/1999   (EP) .

OTHER PUBLICATIONS

Bill Ledingham: "Dialog Modules: The Building Block Approach to Speech Recognition–13 How SpeechWorks' Components Simplify and Speed Development": Downloaded from http://www.speechworks.com on Mar. 24, 1999.

Randall Sparks, et al., "An Object–Oriented Approach to Dialogue Management in Spoken Language Systems", Human Factors in Computing Systems, Apr. 24–28, 1994, pp. 211–217.

James Rumbaugh, *Object–Oriented Modeling and Design*, Prentice–Hall, Englewood Cliffs, New Jersey, 1991, pp. 2–3.

Grady Booch, *Object–Oriented Analysis and Design with Applications, Second Edition*, Benjamin/Cummings, Redwood City, 1997, pp. 102–103.

* cited by examiner

*Primary Examiner*—Richemond Dorvil
*Assistant Examiner*—Susan McFadden
(74) *Attorney, Agent, or Firm*—Blakely, Sokoloff, Taylor & Zafman LLP; Jordan M. Becker

(57) ABSTRACT

A method and apparatus for creating modifiable and combinable Speech Objects for use in an interactive voice response (IVR) environment. Each Speech Object is for acquiring a particular type of information from a speaker during an interaction between the speaker and a speech recognition mechanism. A Speech Object is an instantiation of a user-extensible class that includes properties, such as prompts and grammars, associated with the corresponding type of interaction. A Speech Object further includes logic for controlling the interaction with the user when executed in a processing system. A Speech Object can be subclassed to add additional properties and functionality to create customized Speech Objects, or such properties can be altered at runtime. Multiple Speech Objects, each for acquiring a particular type of information, can be combined to form a compound Speech Object.

39 Claims, 21 Drawing Sheets

METHOD AND APPARATUS FOR CREATING MODIFIABLE AND COMBINABLE SPEECH OBJECTS FOR ACQUIRING INFORMATION FROM A SPEAKER IN AN INTERACTIVE VOICE RESPONSE SYSTEM

FIELD OF THE INVENTION

The present invention pertains to interactive voice response (IVR) systems. More particularly, the present invention relates to techniques for assisting developers in creating IVR applications.

BACKGROUND OF THE INVENTION

The use of technology for speech recognition, natural language understanding, and speaker verification is rapidly becoming ubiquitous in everyday life. One application of such technology is in Interactive Voice Response (IVR) systems. IVR systems are commonly used to automate certain tasks that otherwise would be performed by a human being. More specifically, IVR systems are systems which create a dialog between a human speaker and a computer system to allow the computer system to perform a task on behalf of the speaker, to avoid the speaker or another human being having to perform the task. This operation generally involves the IVR system's acquiring specific information from the speaker. IVR systems may be used to perform very simple tasks, such as allowing a consumer to select from several menu options over the telephone. Alternatively, IR systems can be used to perform more sophisticated functions, such as allowing a consumer to perform banking or investment transactions over the telephone or to book flight reservations.

Current IVR systems typically are implemented by programming standard computer hardware with special-purpose software. In a basic IVR system, the software includes a speech recognition engine and a speech-enabled application (e.g., a telephone banking application) that is designed to use recognized speech output by the speech recognition engine. The hardware may include one or more conventional computer systems, such as personal computers (PCs), workstations, or other similar hardware. These computer systems may be configured by the software to operate in a client or server mode and may be connected to each other directly or on a network, such as a local area network (LAN). The IVR system also includes appropriate hardware and software for allowing audio data to be communicated to and from the speaker through an audio interface, such as a standard telephone connection.

To date, no common framework has been available for designing IVR applications. As a result, IVR developers generally custom-design IVR applications for their customers. Consequently, the design process for IVR applications can be time-consuming and labor-intensive, and the IVR applications tend to require substantial prerelease testing. These factors drive up the cost of the IVR system. Further, it can be very difficult for anyone other than experienced software developers to create an IVR software application. Moreover, once an IVR application is created, it tends to be very difficult, if not impossible, to modify it without substantial time and expense. It is therefore desirable to enable IVR developers to more quickly and easily design and construct IVR applications. In particular, it is desirable to provide a framework for creating reusable software components, from which IVR applications can be created quickly and easily, even by relatively inexperienced developers. It is further desirable that such software components be easily modifiable and combinable to provide the ability to form a variety of different IVR applications.

SUMMARY OF THE INVENTION

An aspect of the present invention is a method and apparatus for creating a device for defining a dialog interaction between a speaker and a speech recognition mechanism. The method includes providing a set of properties associated with the interaction and logic for using the set of properties to control the dialog interaction when the logic is executed in a processing system. The method further includes defining an extensible class to include the set of properties and the logic, such that the class can be instantiated as an object in the processing system to control the interaction.

In another embodiment, the method includes providing information representing a first class in an interactive voice response environment; and using a computer system to define a second class as a specialization of the first class. The second class includes a set of prompts associated with the interaction, a set of grammars associated with the interaction, and logic for using the set of prompts and the set of grammars when executed on a processing system to control the interaction between the speaker and the speech recognition mechanism. The second class can be instantiated as one or more objects in the processing system to control the interaction.

In yet another embodiment, the method includes selecting two or more classes, each of which defines operations for an interaction of a particular type between a speaker and a speech recognition mechanism in an interactive voice response environment. At least one of the classes has a set of prompts and a set of grammars associated with it and logic for using the set of prompts and the set of grammars to control an interaction between the speaker and the speech recognition mechanism when executed on a processing system. Each of the classes can be instantiated as one or more objects to control the interaction. A computer system is then used to define a class for use in the interactive voice response environment. The class encapsulates the selected classes and logic for executing objects representing each of the selected classes in a specified order during the interaction with the speaker.

Another aspect of the present invention is an interactive voice response (IVR) system which includes a speech recognition unit, an audio interface, and an IVR platform. The audio interface is configured to communicate audio information with a speaker. The IVR platform is coupled to the speech recognition unit and to the audio interface. The IVR platform includes a speech-enabled application and a speech object. The speech object is invocable in response to the application to control a particular type of audio interaction with the speaker. The speech object further is an instantiation of a user-extensible class, which has a set of properties associated with the corresponding type of interaction and logic for using the set of properties to control an interaction of the corresponding type when the logic is executed.

The present invention also includes information, which may be stored on a machine-readable storage medium, for generating a speech object. The information is for configuring an interactive voice response platform to perform an interaction with a speaker. The information includes information representing a set of properties associated with the interaction. The information further includes logic for using the set of properties to control the interaction when the logic is executed in a processing system. The information further includes information defining the set of properties and the logic to be elements of a user-extensible class, such that the class can be instantiated as one or more speech objects in the processing system to control the interaction.

The present invention further includes information, which may be stored on a machine-readable storage medium, for generating a compound speech object from multiple speech objects. The information defines a class which may be instantiated as an object in the IVR environment. Such object encapsulates two or more other objects, such that each of the objects is for use in acquiring a different type of information from the speaker during an interaction with the speaker, and each of the objects is invocable in a specified order during the interaction.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1A:
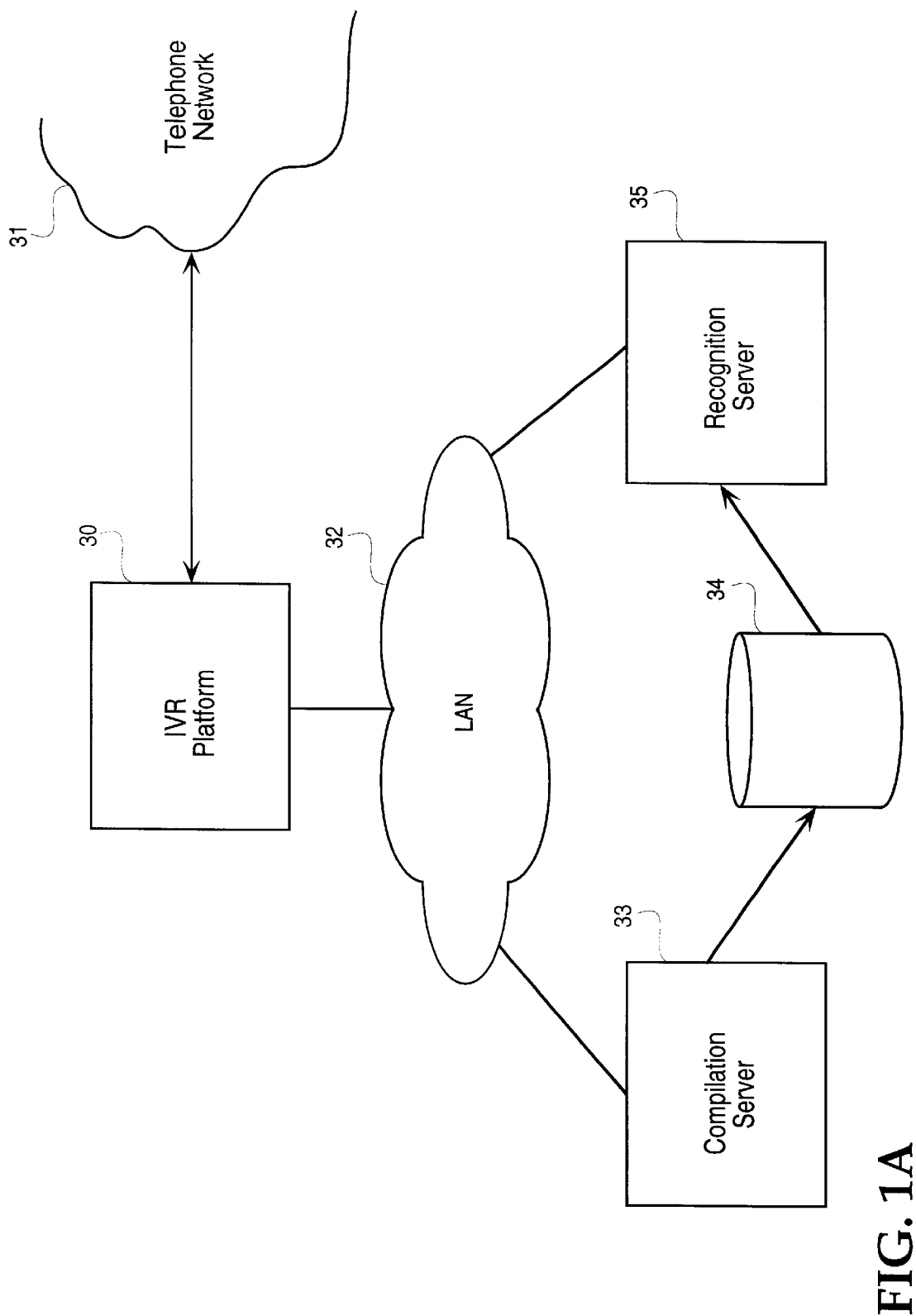
FIG. 1A illustrates an IVR system.

A method and apparatus are described for creating modifiable and combinable speech objects ("Speech Objects") for use in an IVR system. The Speech Objects provide a framework that allows software developers with little or no experience in writing IVR applications to quickly and easily create high-quality IVR applications for any of a variety of uses. As will be described in greater detail below, each Speech Object is a component for controlling a discrete piece of conversational dialog between a speaker and an IVR system. A given Speech Object may be designed to acquire a specific type of information from a speaker. In the embodiments described below, a Speech Object is an instantiation of a user-extensible class defined in an object-oriented programming language. Thus, a Speech Object may be a reusable software component, such as a JavaBean or an ActiveX component. As will be apparent from the following description, Speech Objects can be easily modified and combined to create customized IVR systems.

I. IVR System

As noted above, and as will be apparent from the following description, Speech Objects and other features described below may be embodied in software, either in whole or in part. The software may be executed from memory and may be loaded from a persistent store, such as a mass storage device, or from one or more other remote computer systems (collectively referred to as "host computer system"). In the latter case, for example, a host computer system may transmit a sequence of instructions to the ("target") computer system in response to a message transmitted to the host computer system over a network by target computer system. As the target computer system receives the instructions via the network connection, the target computer system stores the instructions in memory.

In some cases, the downloaded instructions may be directly supported by the CPU of the target computer system. Consequently, execution of the instructions may be performed directly by the CPU. In other cases, the instructions may not be directly executable by the CPU. Under the latter circumstances, the instructions may be executed by causing the CPU to execute an interpreter that interprets the instructions or by causing the CPU to execute instructions which convert the received instructions to instructions which can be directly executed by the CPU.

Also, in various embodiments of the present invention, hardwired circuitry may be used in place of, or in combination with, software to implement the present invention. Thus, the present invention is not limited to any specific combination of hardware circuitry and software, nor to any particular source for the software executed by a computer system.

Note that to facilitate description, certain software components, such as Speech Objects, are described herein as "performing", "executing", or "doing" various functions, "causing" such functions to be performed, or other similar characterizations. However, it will be recognized that what is meant by such characterizations is that the stated function results from execution of the software component by a processor.

A. Overall System Architecture

Refer now to FIG. 1A, which illustrates an IVR system in which the Speech Objects can be implemented. The system includes an IVR platform 30 connected to a conventional telephone network 31. The IVR system also includes a LAN 32, to which the IVR platform 30 is coupled. The system further includes a compilation server 33 and a recognition server 35, each coupled to the LAN 32, a database 34 coupled to the compilation server 33 and the recognition server 35. The IVR system may also include a separate data repository (not shown) containing prompts for use during interactions with a speaker.

In the illustrated embodiment, two or more computer systems connected to the LAN 32 are used to implement the components shown in FIG. 1A. Each of the IVR platform 30, the compilation server 33, the database 34, and the recognition server 35 may be implemented in a separate computer system, or two or more of these components may be implemented in the same computer system. Each such computer system may be a PC, a workstation, or any other suitable computing platform. Note that while the IVR system components are shown distributed on a LAN, in alternative embodiments these components may be connected to each other directly and even included within a single computer system. Yet in other embodiments, these components may be distributed across a different type of network, such as a wide area network (WAN), the Internet, or the like.

In general, the IVR system operates as follows. The IVR platform 30 maintains and executes a speech-enabled software application. The application may be, for example, one which allows the telephone caller to perform telephone banking functions using voice commands. The IVR platform 30 further includes appropriate hardware and software for establishing bidirectional audio communication with the telephone network 31. Accordingly, the telephone caller (hereinafter "speaker") at a remote end of the telephone network contacts the IVR platform 30 via the telephone network 31. As will be described further below, the IVR platform 30 may also maintain and use one or more Speech Objects such as described above. The recognition server 35 includes a conventional speech recognition engine. Audio data acquired by the IVR platform 30 from the speaker is provided to the recognition server 35 via the LAN 32. The recognition server 35 performs standard speech recognition functions on the acquired audio data, using data stored in the database 34, and provides the results to the IVR platform 30 via the LAN 32. The data stored in database 34 includes grammars, voice prints, and/or other data which may be used in processing a dialog with a speaker. The compilation server 33 operates during an initialization phase (i.e., prior to receiving the telephone call from the speaker) to store data, such as the necessary grammars, in the database 34 in an appropriate format.

Figure 1B:
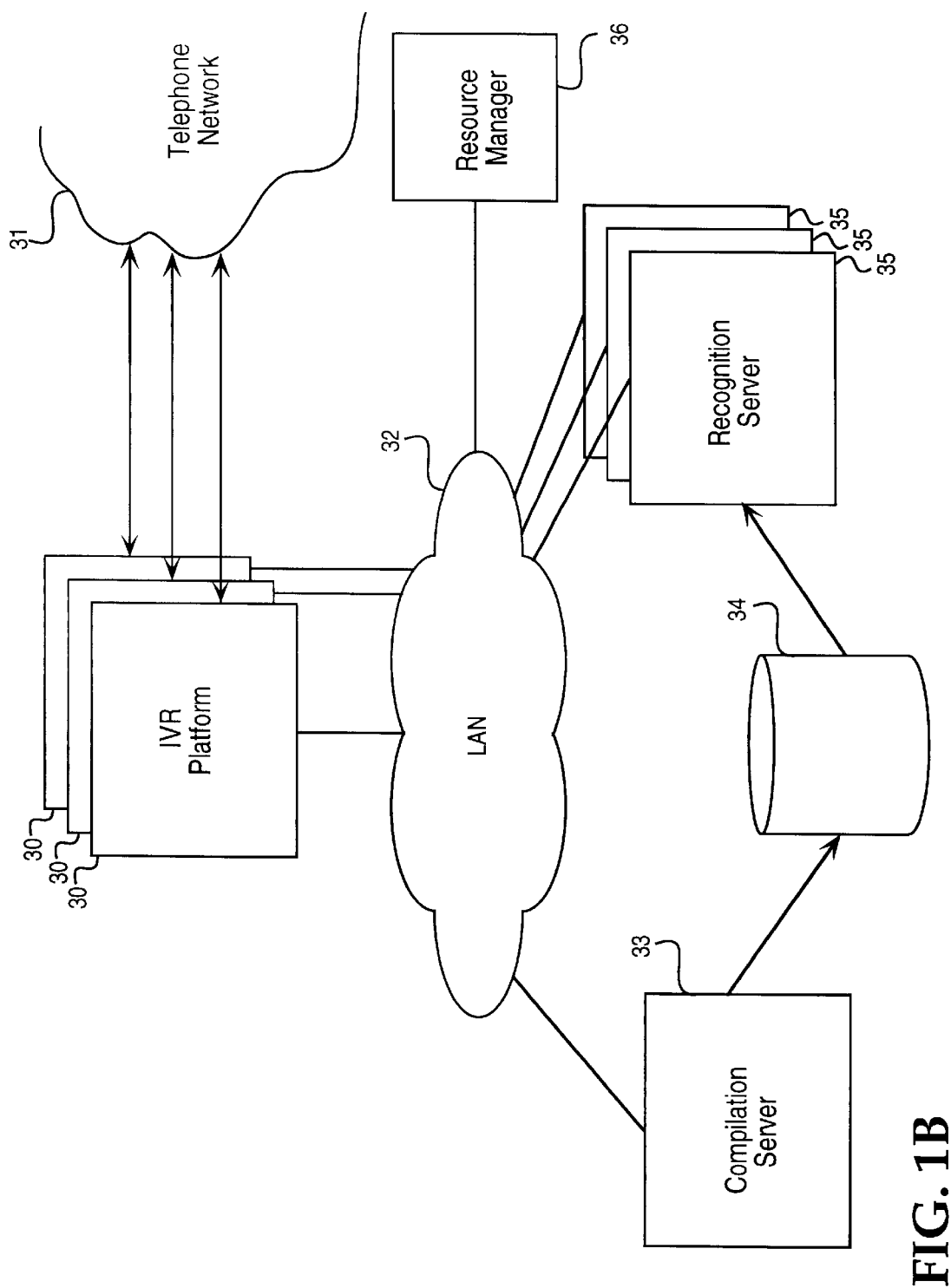
FIG. 1B illustrates an IVR system including multiple IVR platforms and multiple recognition servers.

An IVR system used in accordance with the present invention may include multiple IVR platforms 30, each including and executing a different speech-enabled application or a different instance of the same speech-enabled application. Similarly, alternative embodiments may include multiple recognition server's 35. Thus, FIG. 1B illustrates an embodiment that includes multiple IVR platforms 30 and multiple recognition server's 35, each coupled to the LAN 32. Each of the IVR platforms 30 is also coupled to the telephone network 31. In the embodiment of FIG. 1B, the IVR system also includes a resource manager 36 coupled to the LAN 32 for managing network traffic between the illustrated components, such as between the IVR platforms 30 and the recognition servers 35.

B. Computer System Architecture

Figure 2:
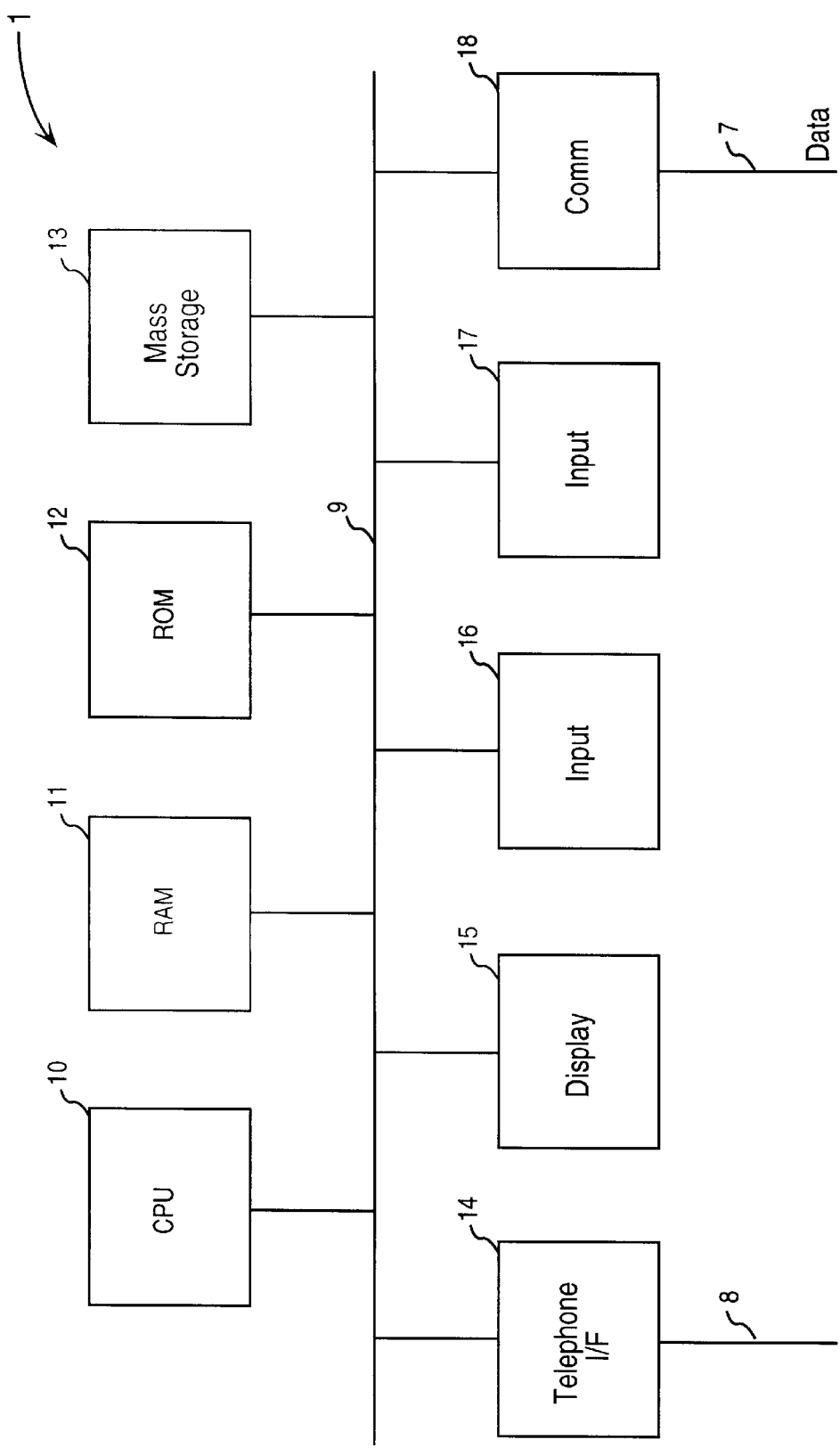
FIG. 2 is a block diagram of the computer system which may be used to implement one or more of the components shown in FIG. 1A.

As indicated above, two or more computer systems are used to implement the various components in the embodiments of FIGS. 1A and 1B. The illustrated components may each be implemented in a separate computer system, or two or more of these components may be implemented in a given computer system. FIG. 2 is a block diagram showing the hardware components of a computer system 1, which is representative of any of the computer systems that may be used to implement the components shown in FIGS. 1A and 1B. Note that FIG. 2 is a high-level conceptual representation that is not intended to represent any one particular architectural arrangement. The computer system 1 includes a microprocessor (CPU) 10, random access memory (RAM) 11, read-only memory (ROM) 12, and a mass storage device 13, each connected to a bus system 9. The bus system 9 may include one or more buses connected to each other through various bridges, controllers and/or adapters, such as are well-known in the art. For example, the bus system 9 may include a main bus, or "system bus", that is connected through an adapter to one or more expansion buses, such as a Peripheral Component Interconnect (PCI) bus.

Also coupled to the bus system 9 are a conventional telephone (POTS) interface 14, a display device 15, a number of different input devices 16 and 17, and a data communication device 18. The telephone interface 14 includes the hardware that connects the computer system 1 to the telephone line 8 to provide a voice interface with a telephone caller. The telephone interface 14 provides functions such as analog-to-digital (A/D) conversion, and may also provide echo cancellation, and other types of signal conditioning, as well as a voice activity detector (VAD) (sometimes referred to as an "endpointer") function for determining the temporal boundaries of a telephone caller's speech. Alternatively, some or all of these functions may be implemented in software executed by the CPU 10. Note that devices which perform these functions are well-known in the art and are commercially available. Note also that certain embodiments may not require the telephone interface 14; for example, an embodiment of the IVR system which uses an Internet Protocol (IP) telephony, or Voice-over-IP (VoIP), interface with the speaker, may use data communication device 18 to receive audio data from the speaker, rather than the telephone interface 14.

Mass storage device 13 may include any suitable device for storing large volumes of data, such as a magnetic disk or tape, magneto-optical (MO) storage device, or any of various types of Digital Versatile Disk (DVD) or compact disk (CD-X) storage. The display device 18 may be any suitable device for displaying alphanumeric, graphical and/or video data to a user, such as a cathode ray tube (CRT), a liquid crystal display (LCD), or the like, and associated controllers. The input devices 16 and 17 may include any of various types of input devices, such as a keyboard, and mouse, touchpad, or trackball, or a microphone for speech input. The communication device 18 may be any device suitable for or enabling the computer system 1 to communicate data with another computer system over a communication link 7, such as a conventional telephone modem, cable modem, satellite modem, Integrated Services Digital Network (ISDN) adapter, Digital Subscriber Line (xDSL) adapter, network interface card (NIC), Ethernet adapter, or the like.

Note that many variations on the embodiment of FIG. 2 will also support the techniques described herein. Hence, components may be added to those shown in FIG. 2, and components shown in FIG. 2 may be omitted, without departing from the scope of the present invention. For example, it may only be necessary for one computer system in the IVR system to include a telephone interface device 14. Further, if a given computer system will not be used for any direct user I/O operations, such computer system may not require a display device 15, a keyboard, or other similar I/O devices.

II. Speech Objects

Figure 3:
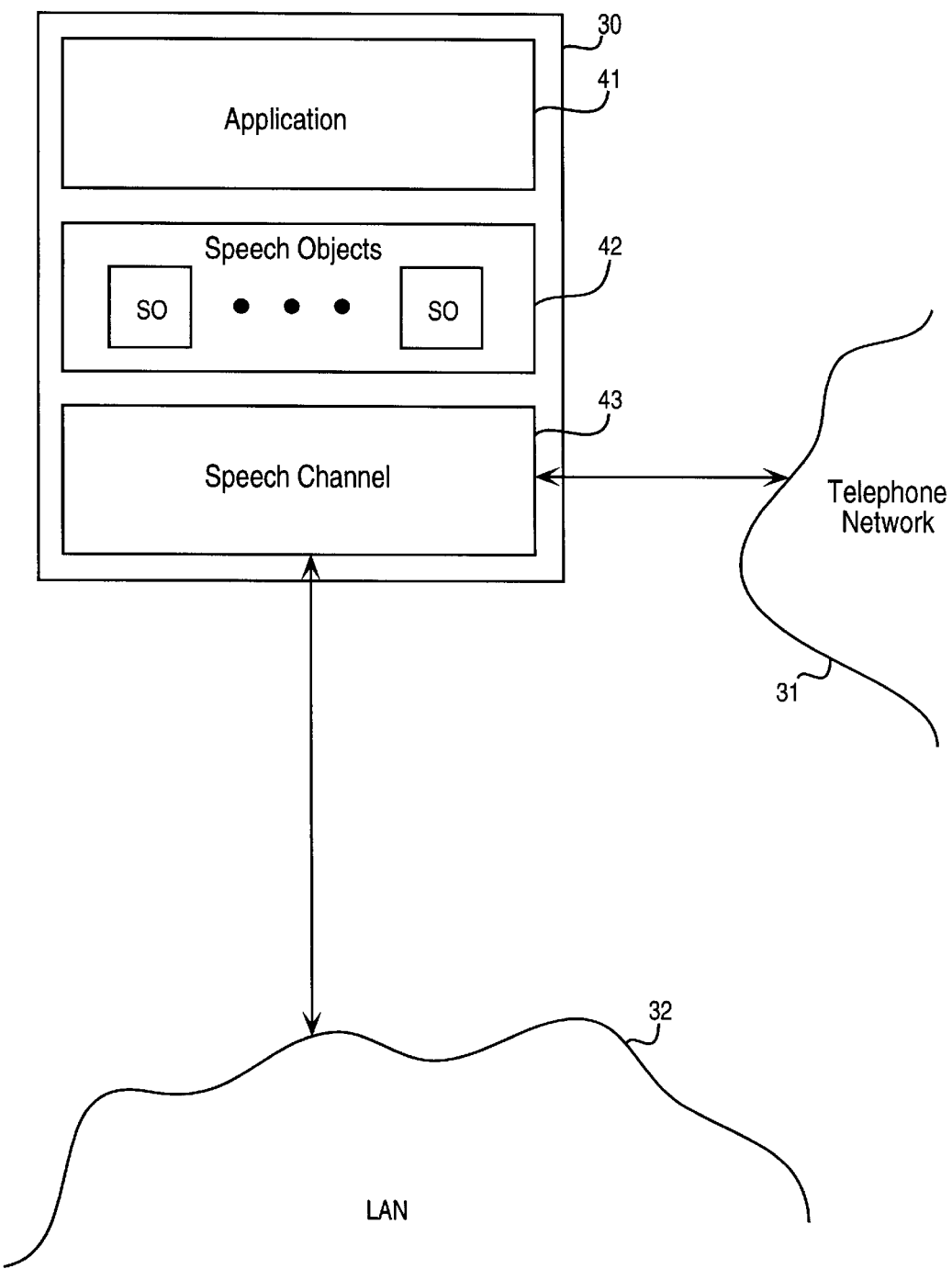
FIG. 3 shows an IVR platform including a speech-enabled application, a number of Speech Objects, and a Speech Channel.

Refer now to FIG. 3, which illustrates the IVR platform 30 in greater detail, according to at least one embodiment. As shown, the IVR platform 30 maintains and executes a speech-enabled application 41. In addition, the IVR platform 30 maintains and executes one or more Speech Objects 42 (multiple Speech Objects 42 are shown) and a SpeechChannel object 43. As described above, there may be multiple instances of the IVR platform 30 in a given IVR system. The SpeechChannel 43 is described further below. Each of the Speech Objects 42 is a component for controlling a discrete piece of conversational dialog between a speaker and the IVR system. A Speech Object may be designed to acquire particular type of information from the speaker. Hence, in its simple form, a Speech Object may simply play a prompt, wait for an utterance from the speaker, recognize the utterance (using the recognition server), and return the result of the recognition operation to the application 41. For example, a simple Speech Object may be designed to acquire a simple "yes" or "no" response from the speaker to a particular prompt. As another example, a Speech Object may be designed to acquire a particular type of date, such as a flight departure date, from the speaker.

The Speech Objects described herein are designed to be used hierarchically. Hence, a Speech Object may be a user-extensible class, or an instantiation of such a class, defined in an object-oriented programming language, such as Java or C++. Accordingly, Speech Objects may be reusable software components, such as JavaBeans or ActiveX components. To facilitate description, it is henceforth assumed that Speech Objects and all related software components referred to herein are written in Java. However, it will be recognized that other object-oriented programming languages may be used. Assuming the Speech Objects are written as javaBeans, it is also assumed that the IVR platform includes a Java Virtual Machine (JVM).

Each Speech Object includes various properties, such as prompts and grammars, associated with a corresponding type of dialog interaction. A Speech Object further includes logic for controlling an interaction with the speaker when executed in a computer in the IVR system. Additional properties can be added to a Speech Object by creating one or more subclasses of the Speech Object, or by altering its properties at runtime, to create customized Speech Objects. In addition, multiple Speech Objects, each for acquiring a particular type of information from the speaker, can be combined to form a compound Speech Object.

The Speech Objects 42 are all based on a primary Java interface, referred to herein as the SpeechObject interface, which provides basic default functionality and/or functionality that is common to all Speech Objects. In at least one embodiment, this simple interface defines a single method, Invoke, that applications call to run a Speech Object, and an inner class, SpeechObject.Result, which is used to return the recognition results obtained during a dialog executed by the SpeechObject. The Speech Object interface may provide the ability to handle errors and to respond to certain universal utterances, such as "help" or "cancel". From the SpeechObject interface, developers can build objects of any complexity that can be run with a single call. The Invoke method for any given SpeechObject executes the entire dialog for the SpeechObject. A simple Invoke method could simply play a standard prompt, wait for speech, and return the results after recognition completes. A more complicated Invoke method could include multiple dialog states, smart prompts, intelligent error handling for both user and system errors, context-sensitive help, and any other features built in by the developer. To call a Speech Object from the speech-enabled application, however, does not require that the developer know anything about how the Invoke method is implemented. The developer only needs to provide the correct arguments and know what information he wants to extract from the results.

Figure 4:
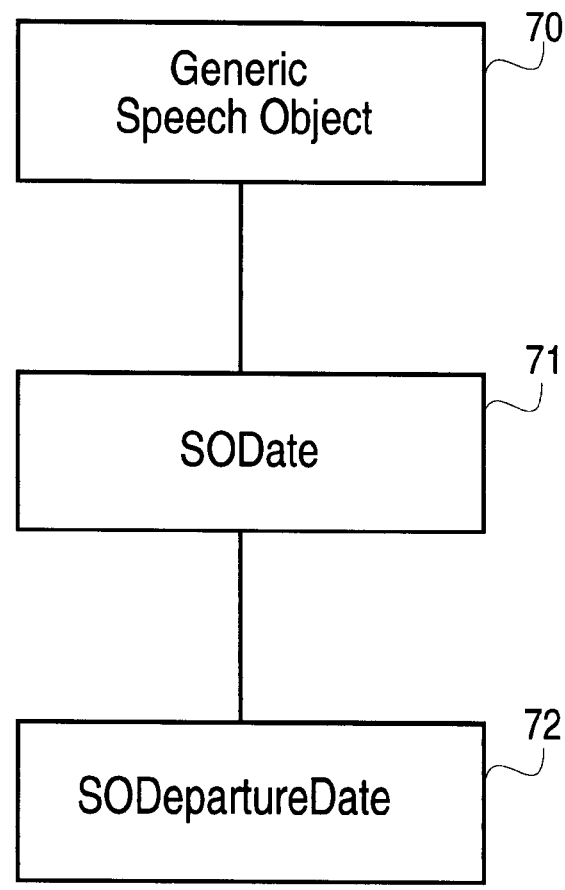
FIG. 4 is a diagram showing the inheritance relationships between three Speech Objects.

A Speech Object can be created as a subclass of an existing Speech Object to create a more-specialized Speech Object, as illustrated in FIG. 4. FIG. 4 shows the hierarchical relationships between three illustrative Speech Objects 70, 71 and 72. The root Speech Object 70 is a generic Speech Object, which may be the SpeechObject interface or any other Speech Object designed with a set of basic methods and/or properties common to all Speech Objects. From the generic Speech Objects 70, a more specialized Speech Object may be derived for acquiring particular type of information from a speaker. Accordingly, Speech Object SODate 71 is defined as a subclass of the generic Speech Objects 70 and is designed to acquire a date from the speaker. In addition, the Speech Object SODepartureDate 72 is defined as a subclass of Speech Object SODate 71 and is designed to acquire a specific type of date, i.e., a departure date, from the speaker, such as may be needed to process a travel reservation. Techniques for creating a sub class of a Speech Object to create a more specialized Speech Object is discussed further below.

Figure 5:
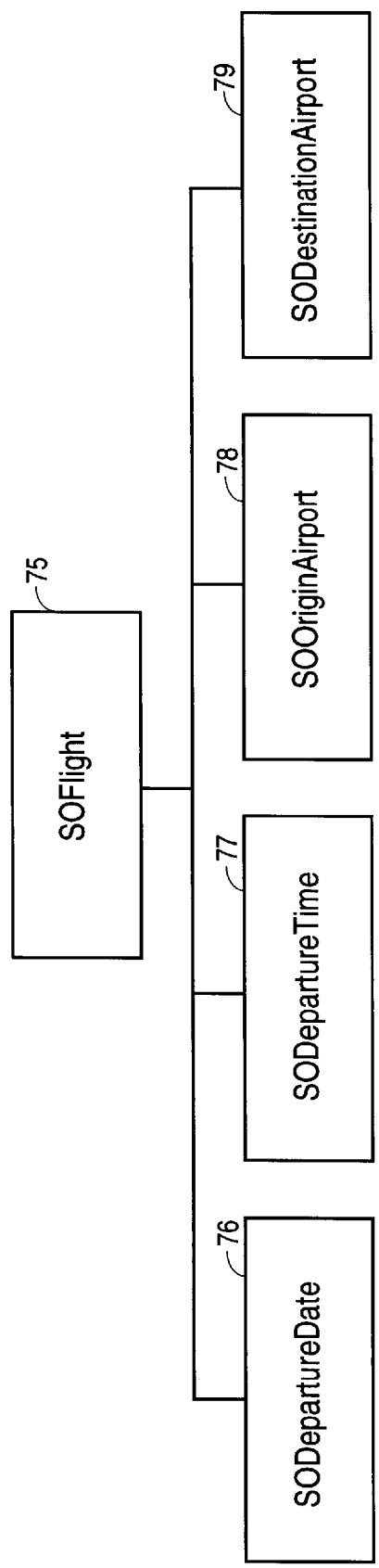
FIG. 5 is a diagram illustrating a compound Speech Object and its component Speech Objects.

A Speech Object can also be constructed from multiple preexisting Speech Objects-such a Speech Object may be referred to as a compound Speech Object. An example of a compound Speech Object is conceptually illustrated in FIG. 5. In particular, FIG. 5 shows the compound Speech Object SOFlight 75, which may be a Speech Object used to acquire flight information from a speaker to allow the speaker to make a flight reservation over the telephone. Speech Object SOFlight 75 is constructed from four other Speech Objects, i.e., SODepartureDate 76, SODepartureTime 77, SOOriginAirport 78, and SODestinationAirport 79, each of which is designed to acquire a specific type of information, as indicated by the name of each Speech Object. A technique for creating a compound Speech Object is discussed further below. Creation of compound Speech Objects is described further below with reference to FIGS. 6A and 6B.

III. Supporting Objects

A Speech Object may use any of several supporting objects to maintain state information across an application and to obtain access to the rest of the IVR system. As with the Speech Objects themselves, each of these supporting objects may be defined as Java classes. These supporting objects are passed to the Invoke method for each Speech Object. In some cases, these objects are modified by a call to an Invoke method or by other application events, providing information that can be used subsequently by other Speech Objects. In at least one embodiment, these supporting objects include objects referred to as SpeechChannel, CallState, AppState, and DialogContext, which will now be described.

A. SpeechChannel

As noted above, the IVR platform 30 includes an object known as the SpeechChannel 43 in at least the embodiment of FIG. 3. The SpeechChannel 43 is one of the above-mentioned supporting objects and provides much of the core functionality of a IVR application. The SpeechChannel 43 essentially forms a bridge between the application 41 and the rest of the IVR system. More specifically, the Speech-Channel provides access to the audio interface (e.g., the telephone line or microphone) and to the recognition server 35. The SpeechChannel interface defines the abstract protocol for all SpeechChannel objects, including methods for recognizing speech, managing and playing the current prompt queue, recording, setting and getting recognition parameters, installing and manipulating dynamic grammars, and performing speaker verification. Note that a code-level definition of the SpeechChannel 43 and its included methods and properties, and other objects described herein, is not necessary for a complete understanding of the present invention and is therefore not provided herein.

The actual SpeechChannel object used in a given IVR environment provides a bridge to the rest of the IVR system for that environment. Such separation of interfaces allows developers to use Speech Objects in a platform independent way. Different implementations of the SpeechChannel interface may support the requirements of various platforms, while providing a constant interface to the SpeechObjects that use them.

Referring again to FIG. 3, the SpeechChannel 43 is the object that provides recognition functionality to the Speech Objects 42. Essentially, the SpeechChannel 43 is a handle to the speaker with whom a Speech Object is supposed to interact and to the recognition system that will be used to recognize the speaker's speech (e.g., compilation server 33, database 34, recognition server 35, resource manager 36). When a new telephone call is received by the IVR platform 30, the SpeechChannel 43 answers the call. The application 41 uses the SpeechChannel 43 to interact with the caller, including the services mentioned above. For non-telephony environments, a SpeechChannel is allocated when the application is launched and persists until the application terminates. An application developer uses SpeechObjects to implement the dialog flow, and a Speech Object developer uses SpeechChannel methods to implement the recognition functionality of the dialog.

Interfaces that may be used to provide SpeechChannel's functionality will now be described. In certain embodiments, the functionality is provided using four interfaces: the main speech channel interface which provides recognition and audio functions, and three separate interfaces that define the functionality for: 1) dynamic grammars, 2) speaker verification, and 3) telephony features. A dynamic grammar interface may be used to provide the ability to create and modify grammars at runtime. This functionality may be used to build caller-specific grammars, for example, for personal address books. Such functionality can also be used to allow Speech Objects to construct grammars on-the-fly; such functionality enables a Speech Object to be executed on any SpeechChannel, even if that SpeechChannel was not initialized with any information the configuration of that Speech Object. This feature therefore facilitates development, since the system propagates necessary information through the network dynamically. A speaker verification interface may be used to provide the ability to verify that a speaker is who he claims to be by analyzing his voice. A telephony interface may be used to allow Speech Objects to answer calls, place calls, transfer calls, recognize DTMF tones, etc.

The SpeechChannel 43 is the primary object that provides access to the corresponding implementation of the other interfaces. Speech Objects 42 work with the single Speech-Channel object passed to them, and can access the above-mentioned interfaces when needed. A SpeechChannel 43 is allocated for the lifespan of the application, and may be used by all Speech Objects 42 in the IVR platform 30. The SpeechChannel 43 is typically allocated by some part of the runtime environment and is passed to the Speech-enabled application. These interfaces can be implemented in the same class or in separate classes, as appropriate for the platform. In either case, the SpeechChannel interface defines methods that return each of the other interfaces. For example, if a SpeechObject needed to access dynamic grammar functionality, it could call an appropriate method in the SpeechChannel and use the returned object to make dynamic grammar requests. A more detailed description of the SpeechChannel interfaces follows.

1. SpeechChannel Interface

The SpeechChannel interface defines the methods for access to core speech recognition functionality, including recognition requests, prompt playback, recording of incoming audio, and access to configuration parameters in the recognition engine. With regard to recognition requests, during standard recognition, the recognition engine attempts to recognize whatever audio data is received and return recognition results. During "magic word" recognition the recognition engine monitors the incoming audio data and does not return results until it either detects a specified word or phrase, or times out. Magic word recognition can also be explicitly aborted if necessary.

The SpeechChannel prompt mechanism works by maintaining a queue of prompts, added one at a time, and then playing them back sequentially when a playback method is called. This allows a prompt to be easily constructed from multiple pieces. The queue is emptied after the prompts are played.

Recording of incoming audio can be done implicitly while recognition is performed or explicitly when a SpeechObject wants to record an utterance without sending it to the recognizer. Access to configuration parameters in the recognition engine, allowing applications to get or set the values of parameters at runtime. SpeechChannel interfaces can manipulate parameters with values that are of the "int", "float", or "String" data types.

The SpeechChannel interface also defines the methods for accessing the objects that provide additional functionality (dynamic grammars, speaker verification, and, optionally, telephony handling). SpeechChannel implementors implement these methods to return objects implementing the corresponding interfaces.

2. Dynamic Grammars

For purposes of this description, a "grammar" is defined to be a set of expected utterances by a speaker in response to a corresponding set of prompts. A dynamic grammar interface can be used to provide methods for incorporating dynamic grammar functionality in an application. Dynamic grammar functionality allows recognition grammars to be built or customized at runtime. Typically, this ability might be used to provide grammars that are customized for individual users, but can also be used in any situation where the items to be recognized are not fixed. The SpeechChannel may be configured to support at least two types of dynamic grammars: 1) grammars that are created through a text or voice interface and then inserted at a fixed location in an existing grammar at runtime; and 2) grammars that are created programmatically at runtime and then used directly for recognition, without needing to be inserted in an existing top-level grammar. The former allows a set of variable items, such as a personal dialer list, to be inserted into a larger context. These grammars can also be extended at runtime, either through text or speech interfaces (for example, over the telephone or through a text interface such as a Web page). Grammars that are created programmatically at runtime and then used directly for recognition, without needing to be inserted in an existing top-level grammar, allow any Speech Object to construct a grammar at runtime without having to rely on the contents of precompiled recognition packages.

Installed grammars may be compiled, stored in a database, and cached in any recognition server that loads them. Hence, such grammars do not need to be recompiled and reloaded the second time that Speech Object is run.

3. Speaker Verification Control

The SpeechChannel interfaces may include a speaker verification control interface that provides methods for performing speaker verification in an application. During speaker verification, the speaker's voice is compared to an existing voice model with the intent of validating that the speaker is who he claims to be. The speaker verification control interface includes methods both for performing verification and for creating voice models for individual users. These models may be stored in database 34 (see FIGS. 1A and 1B) and loaded into the verifier when needed. Verification may be performed in tandem with recognition, letting an application verify the content of an utterance (such as a password or account number) along with the voice characteristics.

4. Telephony

The SpeechChannel interface may also include a telephony channel interface. Note, however, that if a particular environment does not support telephony, then the telephony channel interface may be configured to return "null". The telephony channel interface defines a set of methods for call control, which may include placing outgoing calls, waiting for and answering incoming calls, hanging up a call, transferring a call (the underlying telephony hardware determines the type of transfer, for example, a blind transfer), and/or conferencing a call (i.e., connecting to two lines simultaneously).

B. CallState

The objects which support the use of Speech Objects may also include a CallState object to maintain information about the current call. The CallState object is allocated when the call connects and destroyed when the call is terminated, and is passed into each Speech Object invoked during the call. CallState is a subclass of a class referred to as KVSet, which is described below (see section V.C.). CallState provides basic information about the current call, including: 1) which Speech Objects have been invoked and how many times, and 2) a pointer to another object called AppState, which is described in the following section. The CallState class can be subclassed for environments that need to maintain additional information about individual calls.

C. AppState

Speech Objects may also use an AppState object to collect information across the lifetime of an application. Another subclass of KVSet, this object maintains information throughout all calls taken by the application, on all ports. The AppState is allocated when the application is launched, and is passed to the application through the CallState object allocated for each incoming call. An application can get the AppState object from the CallState if necessary. The default implementation of the AppState need not define any data fields to track. However, implementations created for specific environments may track items such as hit count for various objects, global error rate, and global behaviors.

D. DialogContext

Speech Objects may also use a DialogContext object, which is a KVSet subclass used to accumulate information about a dialog across multiple Speech Objects used by a single application. This object is preferably used to encapsulate semantic information related to the content of the dialog, rather than the application-related information encapsulated by a CallState. The actual usage of the DialogContext argument is SpeechObject-specific. The intent is to provide an object that can capture dialog context information that can be used to direct the dialog appropriately.

The manner in which these supporting objects may be used is described further below. Note that other objects may be created to support the use of Speech Objects at the discretion of the developer.

IV. Speech Object Creation

Figure 6A:
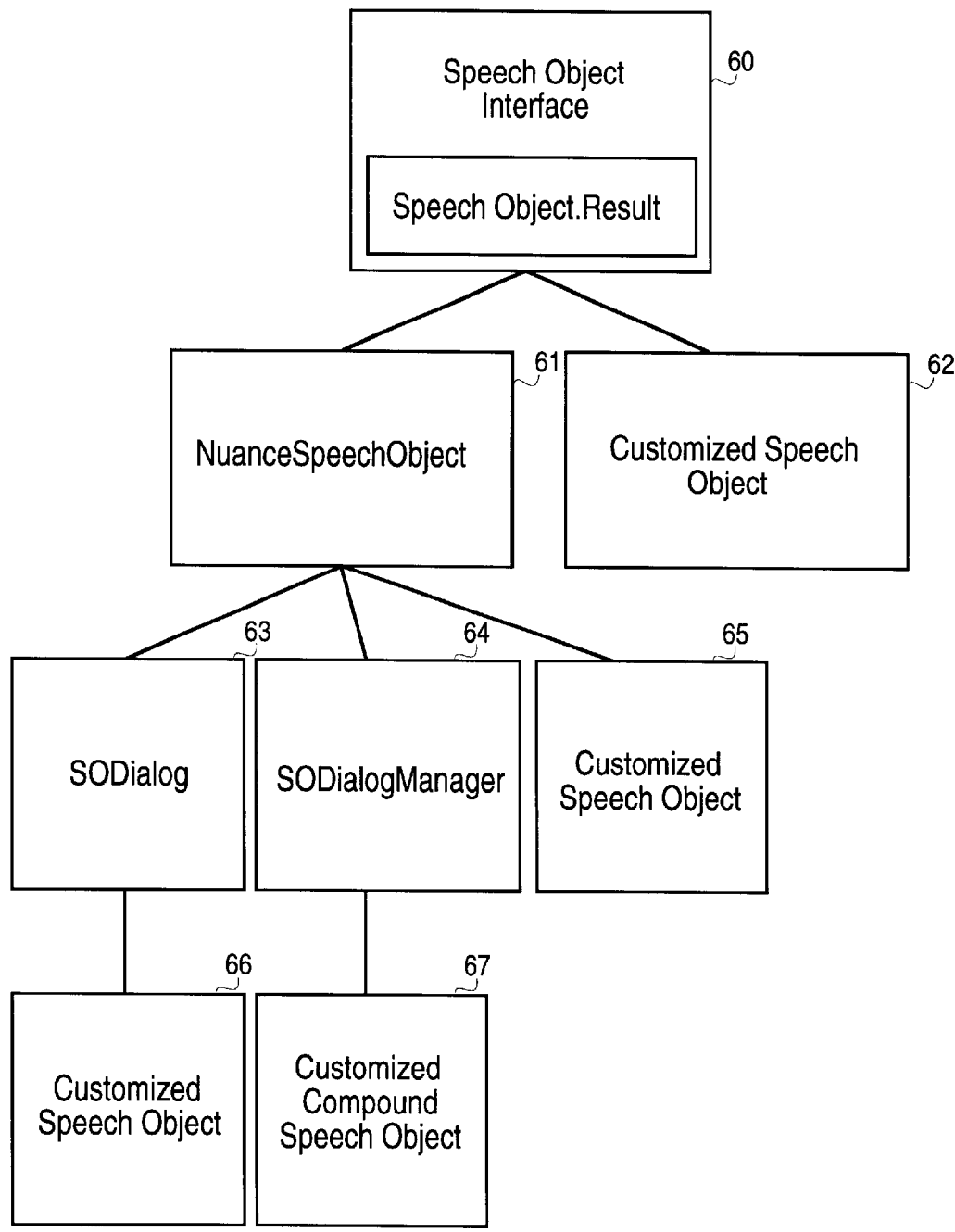
FIG. 6A is a hierarchical diagram of Speech Objects illustrating different ways in which customized Speech Objects can be created through subclassing.

A specific technique for implementing Speech Objects will now be described. As noted above, the Speech Objects of a least one embodiment are all based on a primary Java interface, referred to herein as the SpeechObject interface. FIG. 6A illustrates the hierarchical relationships between the SpeechObject interface 60 and other objects that may be used to create customized Speech Objects. As noted, the SpeechObject interface 60, in at least one embodiment, defines a single method, Invoke, which an application calls to run a Speech Object, and an inner class, SpeechObject.Result, which is used to return the recognition results obtained during a dialog executed by the SpeechObject. From the SpeechObject interface, a developer can build objects of essentially any complexity that can be run with a single call. The Invoke method for any given Speech Object causes the entire dialog for the SpeechObject to be executed. To call a Speech Object from the speech-enabled application, however, does not require that the developer know anything about how the Invoke method is implemented. The developer only needs to provide the correct arguments and know what information he wants to extract from the results.

In certain embodiments, one or more additional objects that include additional methods and/or properties may be provided to allow a developer to more easily create customized Speech Objects. FIG. 6A shows an example of such additional objects, namely, NuanceSpeechObject 61, SODialog 63, and SODialogManager 64. NuanceSpeechObject 61 is a direct subclass of SpeechObject interface 60. SODialog 63 and SODialogManager 64 are direct subclasses of NuanceSpeechObject 61. A customized Speech Object may be created as a direct or indirect subclass of any one of these additional objects 61, 63 and 64. Alternatively, a developer may also create a customized Speech Object 62 that is a direct subclass of the Speech Object interface 60 by including these additional methods and/or properties in the basic SpeechObject interface or in the customized Speech Object itself.

The features provided by these additional objects will now be described. Note that many variations upon these additional objects and their features can be provided without departing from the scope of the present invention. Note that while the methods which may be included in these objects are described below, the details of such methods are not necessary for a complete understanding of the present invention and are therefore not provided herein.

NuanceSpeechObject 61 is a public abstract class that implements the Speech Object interface 60. This class adds default implementations of several basic methods which, in one embodiment, include methods to carry out any of the following functions: getting a key for a Speech Object; setting a key for a Speech Object; returning the Speech Object that should be invoked to ask the question again if the caller rejects a particular SpeechObject's result; and, adding messages (e.g., a key/value pair) into a log file while a Speech Object executes. The aforementioned "keys" are the keys under which the result will be stored in the Dialog-Context object, according to at least one embodiment. The ability to get or set keys, therefore, allows the user to specify the key under which a result will be placed. For example, assuming two Speech Objects, SODepartureDate and SOArrivalDate, both place their results under the "Date" key by default, these Speech Objects can be told to place their results in locations such that the second result will not overwrite the first.

SODialog 63 is a subclass of NuanceSpeechObject 61. SODialog 63 implements the basic behavior for a dialog with a speaker, i.e., playing a prompt, recognizing the input, and returning a result. A developer may create a customized Speech Object by creating an SODialog subclass, such as Speech Object 66, that sets the appropriate prompts and grammar, and returns the appropriate results. Alternatively, the customized Speech Object can be created as a direct subclass of NuanceSpeechObject 61, as is the case for Speech Object 65. A developer may define his own Result inner class to encapsulate the results returned by the customized Speech Object. Properties of SODialog 63 which can be set or gotten at runtime may include, for example, any or all of the following: all prompts, including the initial and help prompts, and the error prompt set; the maximum number of times this SpeechObject can be invoked; and the grammar rule set. Thus, SODialog 63 may include methods for performing any of the following functions: getting and setting a grammar file; getting and setting a grammar file rule name; and, getting and setting prompts, including an initial prompt and help prompts.

SODialog 63 may further include three additional methods, referred to herein as ProcessInterpretation, ProcessRecResult, and ProcessSingleResult. ProcessInterpretation is a method for examining and analyzing a single interpretation inside of an "n-best" recognition result (i.e., the n most likely utterances). ProcessRecResult is a method for examining and analyzing an entire recognition result which contains n results. ProcessSingleResult is a method for examining and analyzing a single result from among the n results contained in a recognition result. Note that other methods may be included in SODialog, if desired.

SODialogManager 64 is a subclass of NuanceSpeechObject 61 which facilitates the creation of compound Speech Objects. In particular, a compound Speech Object may be created as a subclass of SODialogManager 64, as is the case with Speech Object 67. Hence, SODialogManager 64 is essentially a container which encapsulates other Speech Objects to form a compound Speech Object. SODialogManager invokes other Speech Objects as necessary to follow the desired call flow for the compound Speech Object. A compound Speech Object that is a subclass of SODialogManager will follow the prescribed call flow or operate using a central routing state, gathering desired information as necessary. SODialogManager subsequently returns a result when a final state is reached. In addition, SODialogManager optionally may provide for a compound Speech Object to include additional processing logic, packaged as one or more processing objects ("Processing Objects"), which may be executed as part of execution of the compound Speech Object. Thus, in order to implement the foregoing functionality, SODialogManager includes methods for carrying out the following functions: maintaining a list of Speech Objects and/or Processing Objects that are included in the compound Speech Object; adding or deleting Speech Objects and/or Processing Objects from the list; specifying the order of invocation of the included Speech Objects and/or Processing Objects; accumulating the results of the individual included Speech Objects and/or Processing Objects into an overall result structure; and returning the overall result structure to the application. SODialogManager further includes an implementation of an Invoke function which invokes the included Speech Objects and/or Processing Objects in a specified order.

Figure 6B:
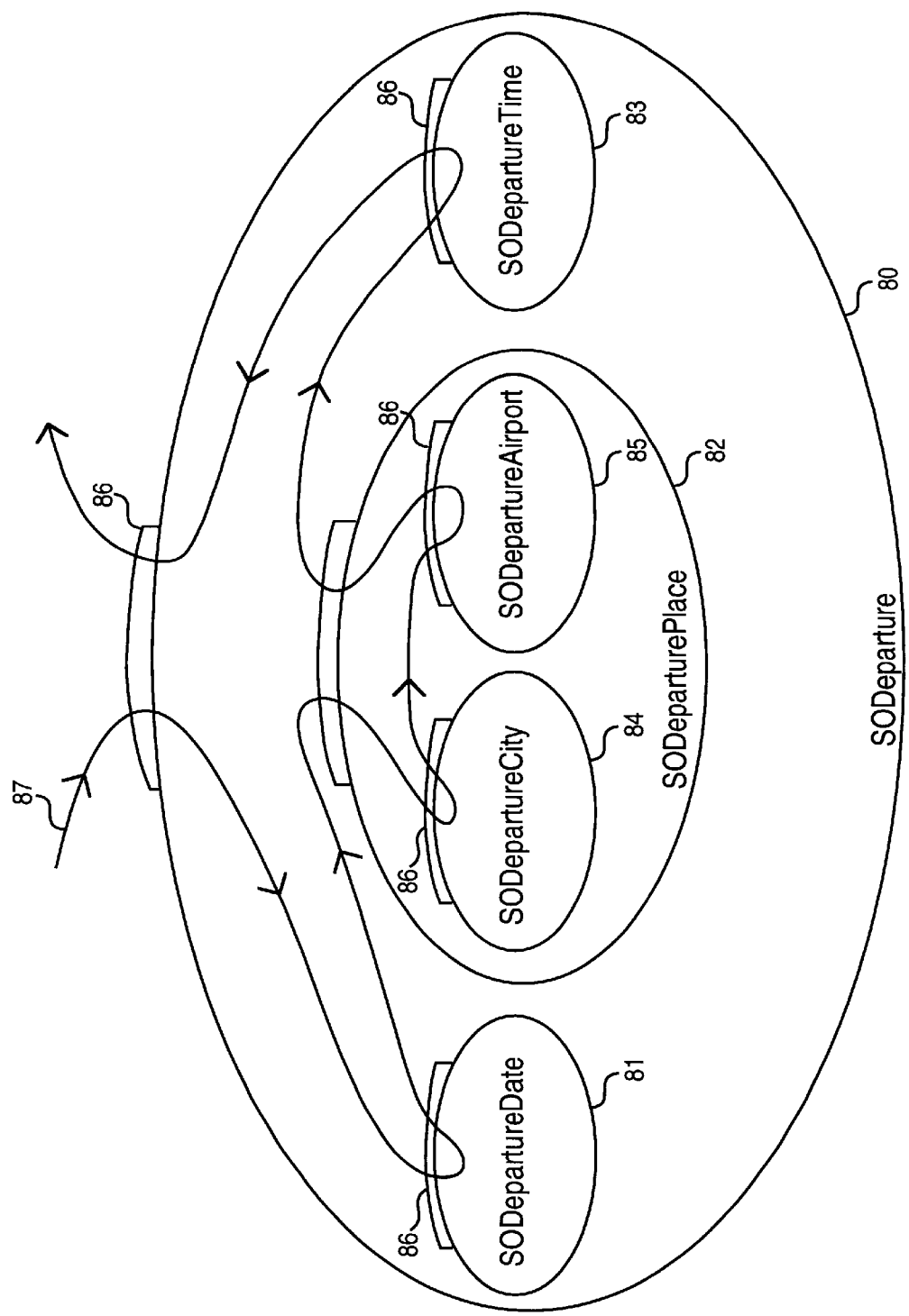
FIG. 6B illustrates several compound Speech Objects.

FIG. 6B illustrates the concept of encapsulation as applied to a compound Speech Object. Specifically, a compound Speech Object, SODeparture 80, may be created as a subclass of SODialogManager, for acquiring information relating to the departure aspect of a speaker's travel reservation. SODeparture 80 encapsulates three other Speech Objects: SODepartureDate 81, SODeparturePlace 82, and SODepartureTime 83, for acquiring departure date, place, and time information, respectively. In addition, SODeparturePlace encapsulates two additional Speech Objects: SODepartureCity 84 and SODepartureAirport 85, for acquiring departure city and airport information, respectively. Thus, the Speech Object SODeparture actually contains two nested levels of compound Speech Objects. Each of these Speech Objects implements the Speech Object interface 86 described above. The SODeparture Speech Object 80 is configured so that its encapsulated Speech Objects (81, 82, 83, 84 and 85) are implemented in a specified order, as represented by example by arrow 87.

Thus, by subclassing from SODialogManager and having each Speech Object implement the Speech Object interface, multiple (essentially any number of) nested levels of compound Speech Objects can be created. In addition, the Speech Object SODeparture 80 may encapsulate additional processing logic packaged as one or more Processing Objects, as noted above. For example, additional logic may be encapsulated in SODeparture 80 and configured to execute after SODepartureDate 81 has finished executing and before SODeparturePlace 82 executes.

Figure 7:
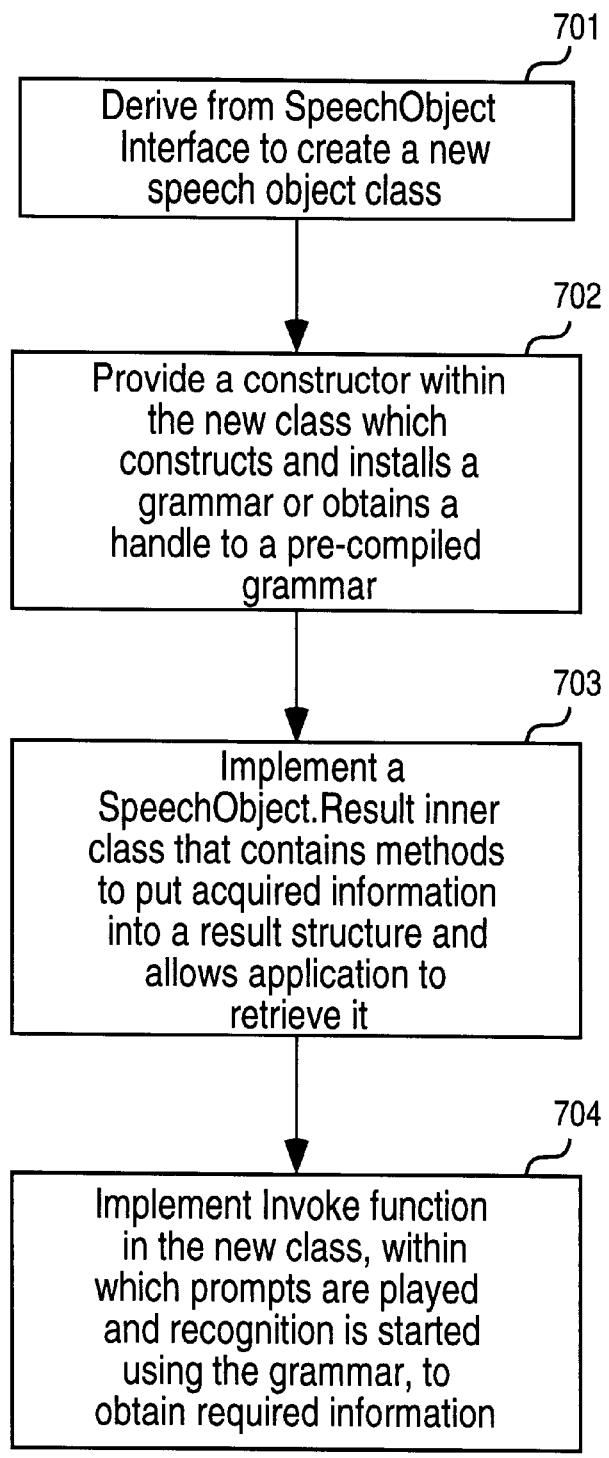
FIG. 7 is a flow diagram showing a routine that may be used to design a Speech Object.

FIG. 7 shows an example of a procedure that a software developer may use to create a simple (non-compound) Speech Object. At block 701, a subclass is derived from the Speech Object interface to create a new Speech Object class. At 702, a constructor is provided within the new class for constructing and installing a grammar or obtaining a handle to a precompiled grammar. At 703, a SpeechObject.Result inner class is implemented that contains methods to put the acquired information into a result structure and allows the application to receive it. At 704, the SpeechObject interface's Invoke function is implemented in the new class, within which prompts are played and recognition is started using the grammar, to obtain the required information.

Figure 8:
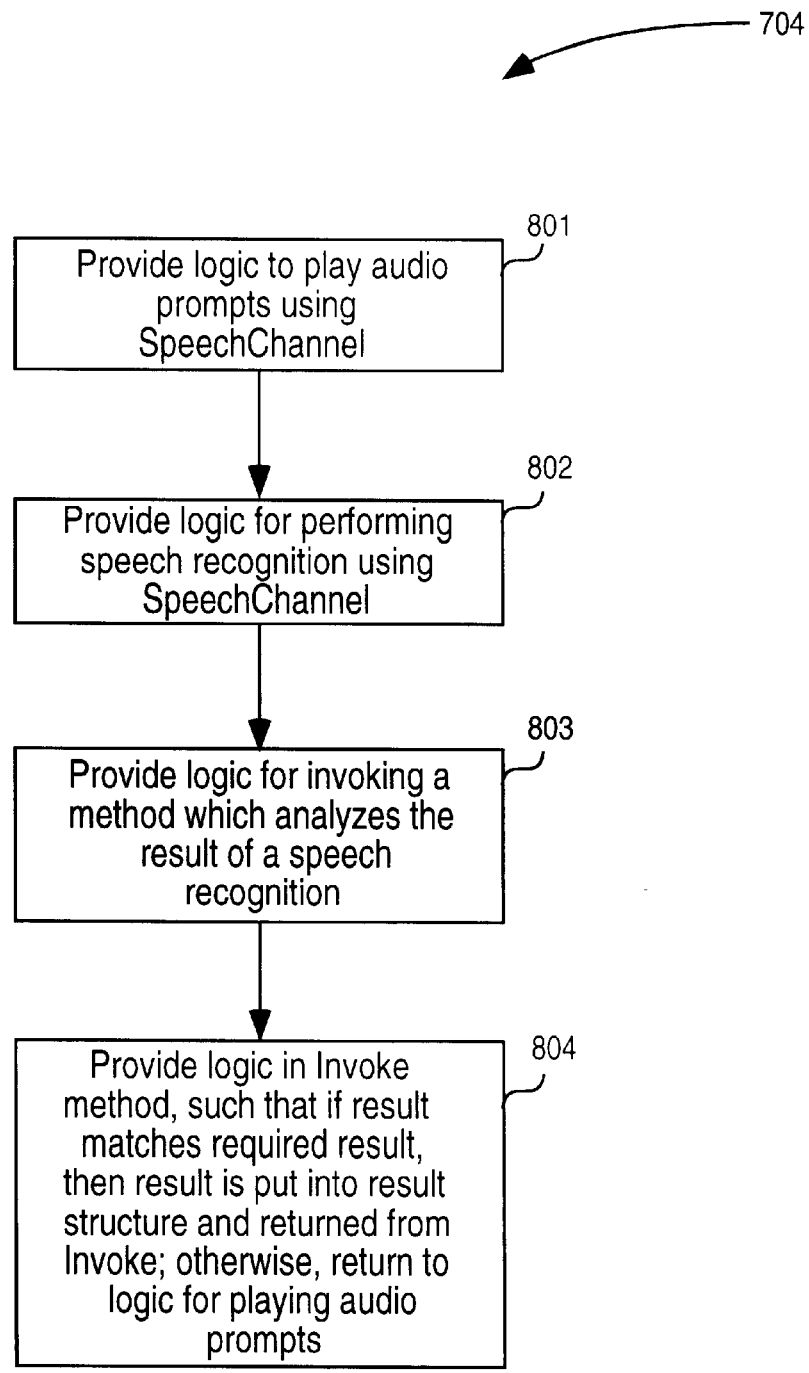
FIG. 8 is a flow diagram showing steps for implementing an Invoke function according to FIG. 7.

FIG. 8 illustrates the steps of block 704 in greater detail, according to at least one embodiment. At block 801, logic for playing audio prompts using the SpeechChannel is provided. At 802, logic for causing the recognition server to perform speech recognition using the SpeechChannel is provided. At 803, logic for invoking a method which analyzes the results of the Speech recognition is provided. At 804, logic is provided in the Invoke method such that, if the recognition result matches the required result, then the result is put into the result structure, and the method returns from Invoke; otherwise, the method returns to the logic for playing the audio prompts, to solicit further input from the speaker.

Figure 9:
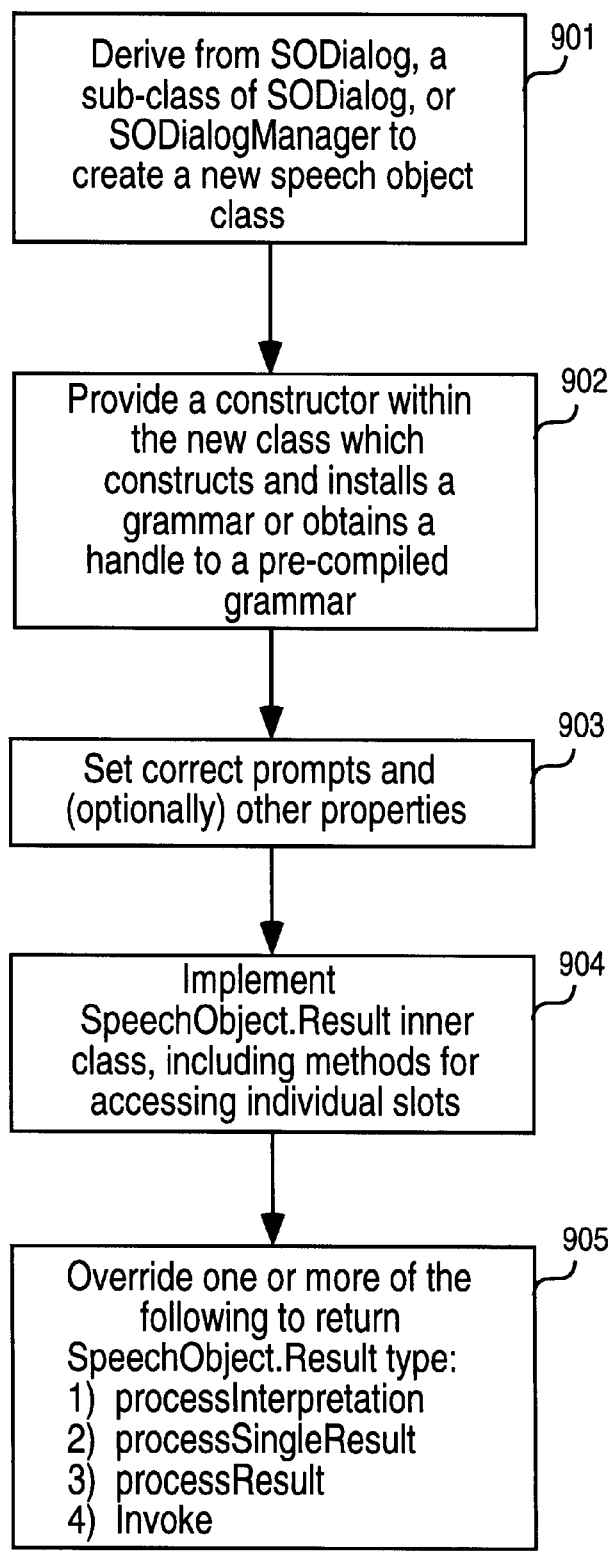
FIG. 9 is a flow diagram showing a routine that may be used to design a Speech Object based on particular generic Speech Objects.

FIG. 9 illustrates an example of a procedure that a developer may use to create a simple Speech Object using the additional objects described in connection with FIG. 6A. At block 901, a subclass is derived from either SODialog, a subclass of SODialog, or SODialogManager, to create a new Speech Object class. At 902, a constructor is provided within the new class for constructing and installing a grammar or obtaining a handle to a precompiled grammar. At 903, the correct prompts and, if appropriate, other properties of the new Speech Object, are set. At 904, the SpeechObject.Result inner class is implemented, including methods for accessing individual natural language "slots" (fields) of the result structure. At 905, one or more of the following methods (described above) are overridden to return the SpeechObject.Result type: ProcessInterpretation, ProcessRecResult, ProcessSingleResult, and Invoke.

Figure 10:
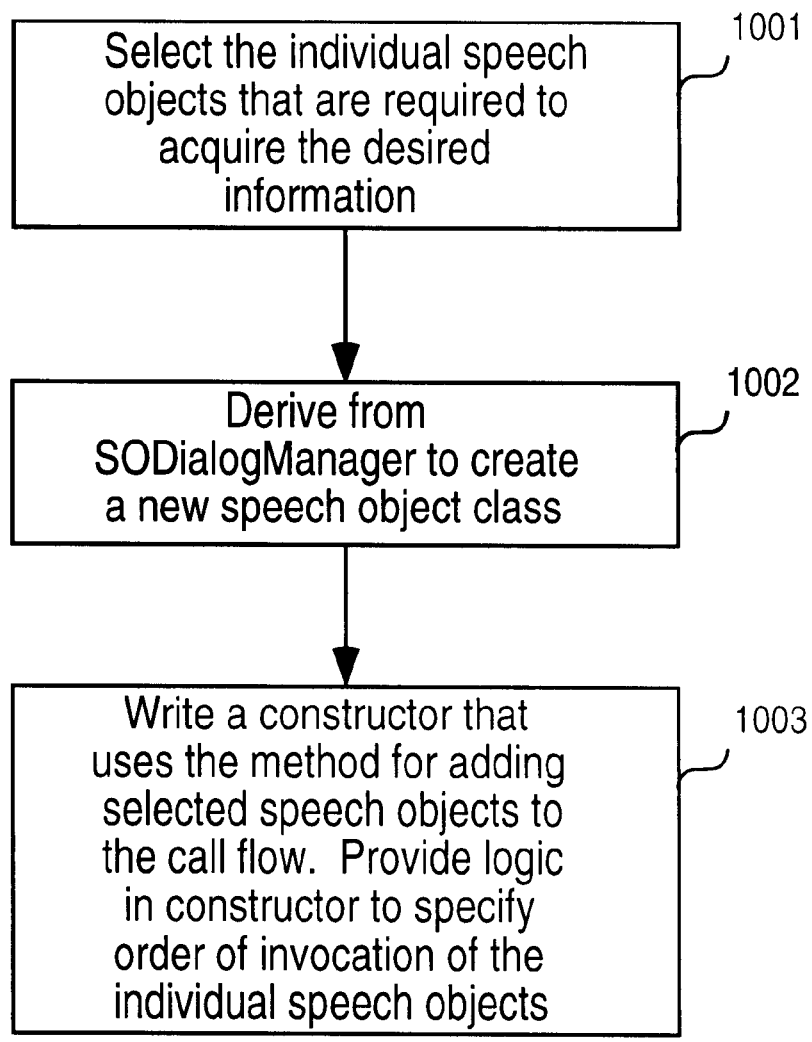
FIG. 10 is a flow diagram showing a routine for creating a compound Speech Object.

FIG. 10 shows an example of a procedure a developer may use to create a compound Speech Object. At block 1001, the individual Speech Objects that are required to obtain the desired information from speaker are selected. Optionally, code packaged as one or more processing objects is also provided. At 1002, a subclass is derived from SODialogManager to create a new Speech Object class. At 1003, a constructor is provided that uses the method for adding the selected Speech Objects (and/or the processing objects) to the call flow. Logic is included in the constructor to specify the order in which the individual Speech Objects (and/or the processing objects) should be invoked. Note that a compound Speech Object can also be created by subclassing from the root Speech Object class (e.g., SpeechObject interface) or any other class, rather than from a more specialized object such as SODialogManager, by including the appropriate methods in the parent class or in the compound Speech Object itself.

V. Use of Speech Objects

Figure 11:
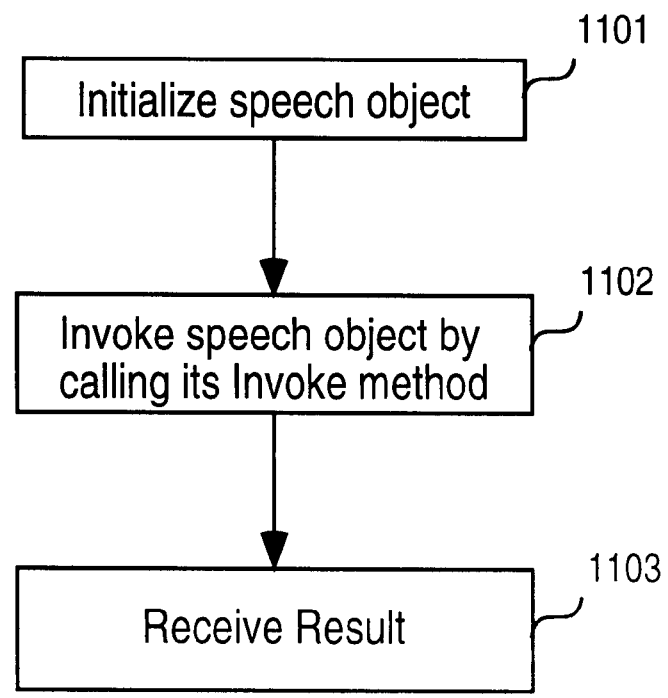
FIG. 11 shows steps performed by a speech-enabled application associated with using a Speech Object.

FIG. 11 illustrates, at a high-level, the steps involved in using a Speech Object in an IVR system. First, at block 1101, the Speech Object is initialized. Next, at 1102, the Speech Object is invoked by calling its Invoke method. At 1103, the result of executing the Speech Object is received by the application. The following commented Java code illustrates how a simple Speech Object for obtaining a yes/no confirmation from a speaker might be used:

//initialize the Speech Object:
SOYesNo confirm=new SOYesNo();
//Invoke the Speech Object:
SOYesNo.Result yesno=(SOYesNo.Result) confirm.invoke(sc, dc, cs);
//Look at results:
if (yesno.saidYes())
    //user said "yes"
else
    //user said "no"

In the above example, "sc", "dc, and "cs" represent the above-described SpeechChannel, DialogContext, and CallState objects, respectively. After running the Speech Object, the speech-enabled application uses the information it receives from the recognition results to determine how to proceed.

A. Initialization of Speech Objects

To initialize a Speech Object, it is first allocated using the Java "new" operator and then, optionally, customized for the application (i.e., the default state may be modified as desired). The types of customization that can be done at runtime depend on the specific Speech Object. Speech Objects may be designed so that runtime customization occurs completely through resetting the Speech Object's properties. Depending on the functionality of the Speech Object, the following are examples of properties that can potentially be set: 1) the audio files used as prompts, including requesting initial input, providing help, and explaining errors; 2) the grammar used for recognition; 3) limits on acceptable input, such as limiting banking transactions to amounts under some maximum amount, or providing flight arrival information only for flights during a certain time period; and, 4) dialog behavior, such as whether or not to confirm answers with a secondary dialog.

A developer can also create simple subclasses to be able to reuse a Speech Object with specific customizations. However, it may be advisable to implement Speech Objects so that any variable behavior can be easily controlled through property access interfaces.

B. Invocation of Speech Objects

Running, or "invoking," a Speech Object means executing the dialog defined by that SpeechObject. The Invoke method that is called to run a Speech Object is a blocking method that returns after the Speech Object has completed the dialog and obtained one or more results from the recognition engine. The SpeechObject interface mentioned above provides a single form of the Invoke method, which in at least one embodiment is as follows:

public Result invoke(SpeechChannel sc, DialogContext dc, CallState cs);

The input arguments to the Invoke method are described in detail above. Generally, these will be created by the runtime environment. The SpeechChannel object, for example, is allocated before a call is answered on a given port, and is passed to the application along with the incoming call information. A Speech Objects-based application is not required to work with these objects directly at all; instead, it can take the objects provided to it and pass them to each Speech Object it invokes. Each Invoke method in turn is configured to work with these objects and provides its own logic for using and updating the information they contain.

Therefore, to run a Speech Object, the invoker simply provides the correct inputs, which are typically generated by the application environment, and waits for the results. The Invoke method returns only when recognition results are available, or when the Speech Object determines it will not be able to complete the recognition, e.g., if the caller hangs up. In the latter case, Invoke preferably generates an exception explaining the cause of the error.

C. Results/KVSet

The Invoke method returns recognition results using an implementation of the base class SpeechObject.Result. Typically, each Speech Object subclass provides its own implementation of the Result class. Each Result subclass should be designed in tandem with the Invoke method for that Speech Object, which is responsible for populating the Result object with the appropriate data to be returned to the application.

The Result class extends a utility class referred to as KVSet. A KVSet object is simply a set of keys (Strings) with associated values. Hence, the KVSet class provides a flexible structure that allows the SpeechObject to populate the Result object with any set of values that are appropriate. These values might be, for example: 1) simple values, such as a String (a name or account number) or an integer value (an order quantity); 2) other object values, such as a Java Calendar object; or 3) another KVSet object with its own set of key/value pairs. This approach allows for nested structures and can be used for more complex recognition results. Hence, Result is a specialized type of KVSet that is used to encapsulate natural language slots and the values they are filled with during recognition operation. For example, a Speech Object for retrieving a simple "yes" or "no" utterance may return a Result with a single slot. The key for the slot may be, for example, "YesNoKey", and the value may be another string, i.e., "yes" or "no".

The implementation of a Result class is at the discretion of the Speech Object developer. However, in at least one embodiment, the SpeechObject.Result base class defines a "toString" method, which can be used to get a transcription of the results, for example, for debugging or for passing to a text-to-speech engine. Each Result class should also include methods allowing easy access to the result data. An application can access the key/value data using KVSet methods. A well-designed Result class, however, should include methods for more natural data access. For example, a Speech Object designed to gather credit card information might include methods for directly accessing the card type, account number, and expiration date. A more fine-grained set of methods might provide access to the expiration date month, day, and year separately.

Another benefit of having a flexible Result subclass is that the Result can make available a much broader range of data than merely the results provided by the recognition operation. The Invoke method can process the data passed back from the recognizer in any number of ways, and the Result subclass can provide access to data in any variety of formats. This processing might include, for example: 1) resolving ambiguities, either through program logic or by invoking a subdialog; 2) breaking down information into more modular units (for example, breaking down the data in a Calendar object into year, month, day of week, and day of month); or 3) providing access to additional data.

D. Playables

By implementing the appropriate interface, referred to herein as the Playable interface, an object can be implemented such that, when invoked, it plays itself to the speaker through an audio device (e.g., the telephone). An object implementing the Playable interface is referred to herein as a "Playable". The Playable interface allows objects to be appended to a prompt queue and then played by the SpeechChannel. Hence, a Result object such as described above may be a Playable that can be played back to the speaker in this manner. For recognition results, this approach makes it easier to implement dialogs that play what was understood back to the speaker for confirmation.

In accordance with at least one embodiment, the Playable interface includes a single function, as follows:

public interface Playable {
      void appendTo(SpeechChannel sc);
    }

Any object that can generate a sequence of prompts representing the information contained in that object can implement the Playable interface; this allows other objects to signal such object to append the sequence of prompts to the queue of prompts being prepared for playback.

Thus, examples of Playable classes that may be implemented include the following:

1) SpeechObject.Result: As described above, this is a Playable class containing the results of a Speech Object invocation. The Speech Object implementor is required to implement the Result class such that the information obtained from the speaker can be played back to that speaker using the Playable interface;

2) a Playable containing a reference to a single audio file;

3) a Playable containing a list of audio files, all of which are to be played in sequence;

3) a Playable that contains another Playable. The first time this Playable is requested to play itself, it does so. Thereafter, it ignores the request; and 4) a Playable that contains a set of Playable objects, one of which is randomly selected to play each time it is requested to play itself.

It will be recognized that a developer can implement many other types of Playable objects. Hence, a developer may specify any Playable as an initial greeting message, a help prompt, a time-out prompt, etc. The Speech Object does not have information about the various types of Playables; it simply calls the appendTo() function of the Playable. Thus the capabilities of a Speech Object can be extended by creating new types of Playable classes and passing instances of those classes to the Speech Object as one of its Playable parameters.

E. Exceptions

Speech Objects may use the exception-handling mechanism built into the Java language, so that Speech Object applications can use standard try/catch code blocks to easily detect and handle problems that may occur while a Speech Object dialog is executing. An example of such usage is as follows:

try {
      result=so.invoke(sc, dc, cs);
    } catch (SpeechObjectException e) {
    //error handling code
    }

The class SpeechObjectException in this context is a subclass of the class, java.lang.Exception, which provides a base class for all exceptions thrown by Speech Object methods. A Speech Object preferably throws an exception when recognition cannot be completed for any reason. The specific exceptions thrown by a Speech Object are at the discretion of the designer of a Speech Object or family of Speech Objects. As examples, however, Speech Object exceptions may be thrown when problems arise related to the dialog itself, such as the caller asking to be transferred to an operator or agent, or the Speech Object dialog continually restarting due to errors and eventually exiting without successfully performing recognition.

For certain other types of "problems", exceptions may be thrown by the SpeechChannel. These exceptions may be derived from the base class SpeechChannelException, and may include: 1) a hang up by the caller during a dialog; 2) a missing prompt file; 3) problems accessing a database referenced during a dialog (for example, for dynamic grammars); or 4) problems resetting configurable parameters at runtime.

A robust Speech Object-based application will handle both types of exceptions, i.e., exceptions thrown by the SpeechChannel and exceptions thrown by individual Speech Objects. SpeechChannel exceptions may be most likely to be thrown by SpeechChannel method calls made from within a Speech Object Invoke method. The SpeechChannelException class also may have a subclass that is thrown by a SpeechChannel when an unrecoverable error occurs. In that case, the SpeechChannel object no longer has an active connection to the telephone line or to recognition resources, and the application needs to be restarted with a new SpeechChannel.

VI. Dialog Server/Platform Adapter Embodiment

It may be desirable for a given Speech Objects to be usable with any of various different IVR platforms.

Similarly, it may be desirable to provide "pre-packaged" sets of Speech Objects, which business enterprises or other IVR platform users can use with their existing IVR platforms. Accordingly, an embodiment of an IVR system which makes this possible will now be described with reference to FIGS. 12 through 19.

A. System Overview

Figure 12:
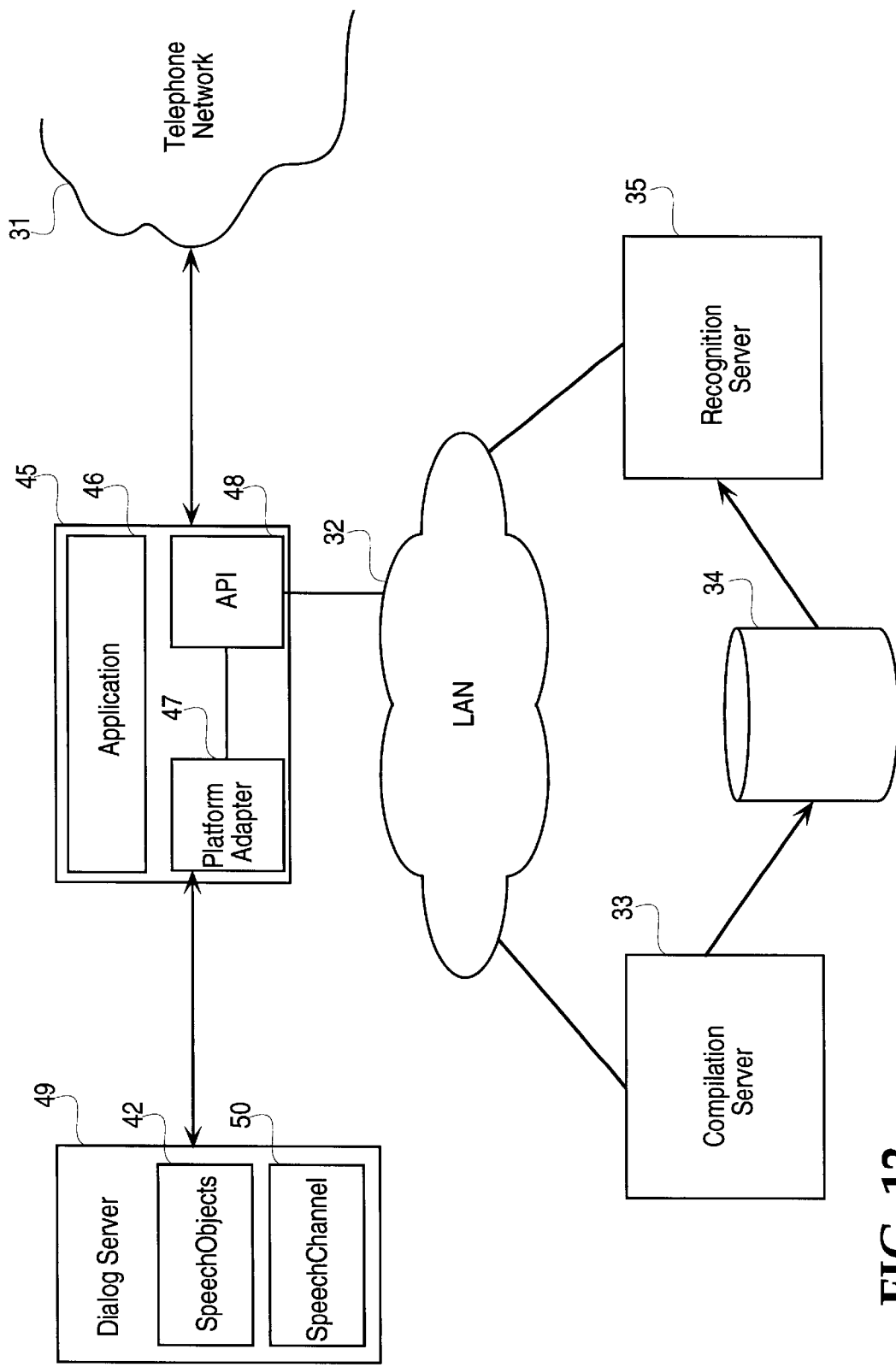
FIG. 12 illustrates an IVR system according to an embodiment in which the Speech Objects are maintained by a Dialog Server separate from the IVR platform.

In an IVR system according to one such embodiment, the Speech Objects are maintained by a separate entity that is external to the IVR platform, as shown in FIG. 12. Specifically, the IVR system of FIG. 12 includes a dialog server 49, separate from the IVR platform 45, which maintains one or more Speech Objects 42 such as described above. The dialog server 49 also maintains a SpeechChannel object 50 such as described above. The IVR platform 45 includes a speech-enabled application 46, an application program interface (API) 48, and a platform adapter 47. All other components illustrated in FIG. 12 may be assumed to be essentially identical to those described in connection with FIG. 1A. The primary function of the dialog server 49 is to load and run the Speech Objects 42 when they are required. The dialog server 49 may be implemented in a separate computer system from the IVR platform 45. Assuming the Speech Objects are written in Java, the dialog server may be assumed to include a JVM. The platform adapter 47 enables the speech-enabled application 46 in the IVR platform 45 to utilize the Speech Objects 42. The details of the API 48 are not germane to the present invention. However, the API 48 may be assumed to be any appropriate API that is specific to the application 46 and which enables communication between the application 46 and other components on the LAN 32, such as the recognition server 35.

The dialog server 49 runs the Speech Objects 42 on behalf of the platform adapter 47. The platform adapter 47 invokes the Speech Object on the dialog server 49, which in turn instructs the platform adapter 47 to perform subcommands to achieve what the Speech Object is designed to achieve. The subcommands generally relate to functionality of the application 46, but may also include, for example, the playing of prompts on the IVR platform 45 using its normal mechanisms. Note that to facilitate development of the platform adapter 47, it may be desirable to develop the platform adapter 47 in the native application generation environment of the IVR platform 45 with few external calls.

The dialog server 49 and the platform adapter 47 communicate using a special protocol, referred to herein as Speech Object Protocol (SOP), which is described further below. The SOP protocol uses Transport Control Protocol/Internet Protocol (TCP/IP) for transport and an extensible Markup Language (XML) based language, referred to herein as Speech Object Protocol Data Format (SOPDF), as its data format. The SOPDF language is also described further below. Information on XML is widely available from numerous public sources.

The flow of application development for this embodiment is as follows. First, the application developer acquires Speech Objects from any appropriate source, such as from his own prior development, from another department within his company that publishes Speech Objects, or from an external Speech Object provider (e.g., vendor). Next, the developer loads these objects into the dialog server 49. Then, the rest of the application 46 is implemented on the IVR platform 45 using its native application generation environment. Finally, the application's pieces and the Speech Objects are connected together in the IVR's application generation environment. Therefore, the developer's productivity is significantly boosted, and the cost of development correspondingly decreases. Note that the skill set needed to implement an application with Speech Objects is less than implementing an application without them.

Figure 14:
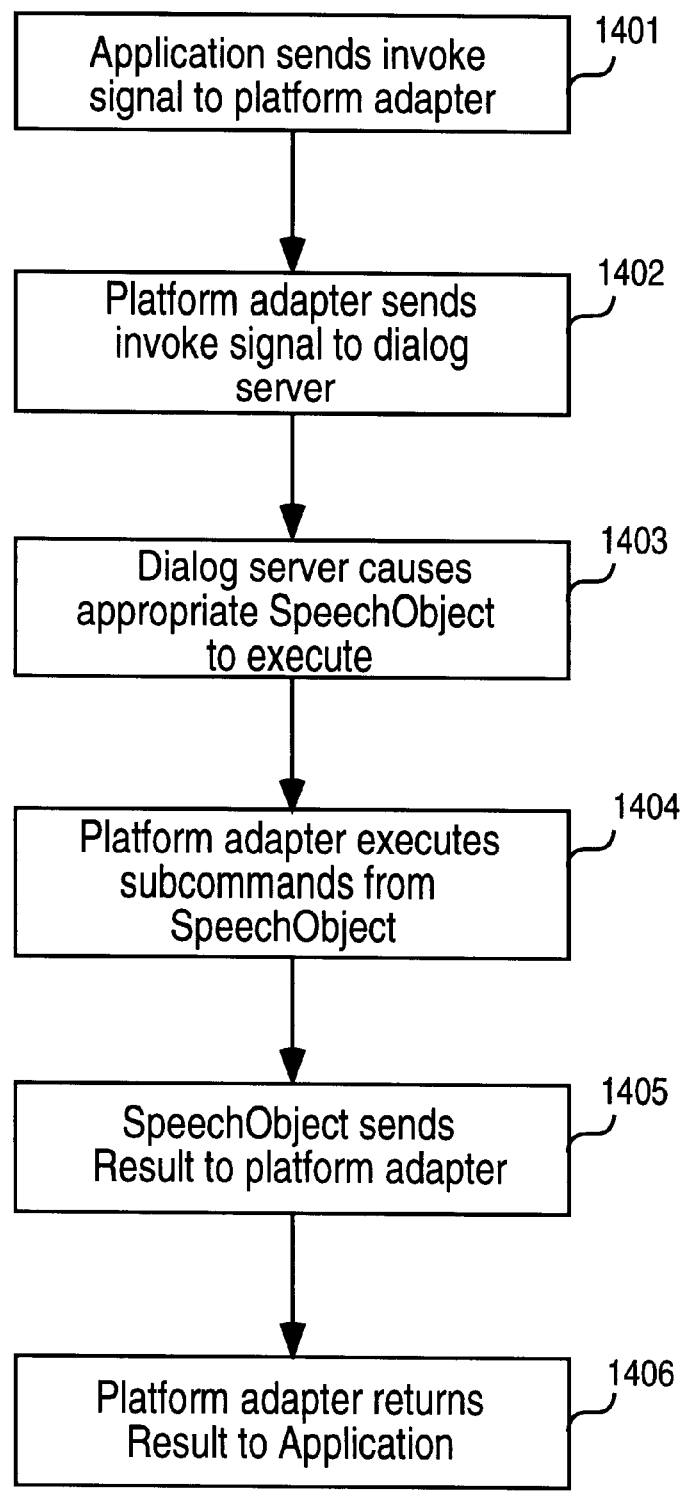
FIG. 14 is a flow diagram showing a routine for using the platform adapter and the dialog server to execute a Speech Object in an embodiment according to FIG. 12.

Consider now, with reference to FIG. 14, the interactions between the components when the application 46 invokes a simple, illustrative Speech Object that collects the current date. Initially, when the application 46 instance starts on the platform 45, the platform adapter 47 starts a session, which indicates to the dialog server 49 that its services will be needed at some future time. The application 46 then proceeds to answer the telephone and execute its IVR functions as usual. When it is time to invoke the date Speech Object, the application 46 sends an invoke signal to the platform adapter 47 with the name of the Speech Object and its associated parameters (block 1401). These parameters are specified by the designer of the Speech Object to influence how the object will execute. The platform adapter 47 then sends an invoke signal to dialog server 49 (1402). The dialog server 49 then causes the Speech Object to execute (1403). Once the Speech Object is invoked, it requests the platform adapter 47 to perform an atomic play/recognize (or, if unsupported, a play followed by a recognition). Optionally, other functions also can be requested of the platform adapter by the Speech Object. The Speech Object specifies the prompt to play and the grammar to use in the recognition. The platform adapter 47 performs these steps on behalf of the Speech Object and then sends the recognized result back to the Speech Object (1404). The Speech Object may then use the n-best information to perform an error check, for example. Finally, the Speech Object sends one disambiguated result for the entire transaction back to the platform adapter 47 (1405), which passes the result to the application 46 (1406). Note that the single result consists of a KVSet that is defined by that particular Speech Object. From the point of view of the application 46, the application 46 had invoked a Speech Object, and the Speech Object returned with one single Result set, which greatly simplifies the task of the application designer.

B. SOP Protocol

The SOP runs "on top of" a TCP substrate. As noted above, in at least one embodiment, the SOP uses XML for its message transfer format. XML is a metalanguage that describes the allowed words and syntax of a user-specified language. Hence, XML is used to specify the SOPDF language. The advantage of XML is that, as its name suggests, it is extensible while at the same time enforcing a certain rigor in its markup language definition. Once a Document Type Definition (DTD) is specified for SOPDF, then the allowable interactions in SOPDF are clear to anyone who reads the DTD. Further, the DTD can be extended for future enhancements to SOPDF. Additionally, there are a number of open-source parser modules for XML that can understand a DTD and verify the correctness of an incoming message. In addition, other open-source modules can generate a correct XML sequence given the DTD and a set of key-value pairs. The advantages in terms of development times and maintenance headaches with these modules are therefore manifest. In particular, the uses XML provides conformance to industry standards and future extensibility.

C. Protocol Phases

Figure 13:
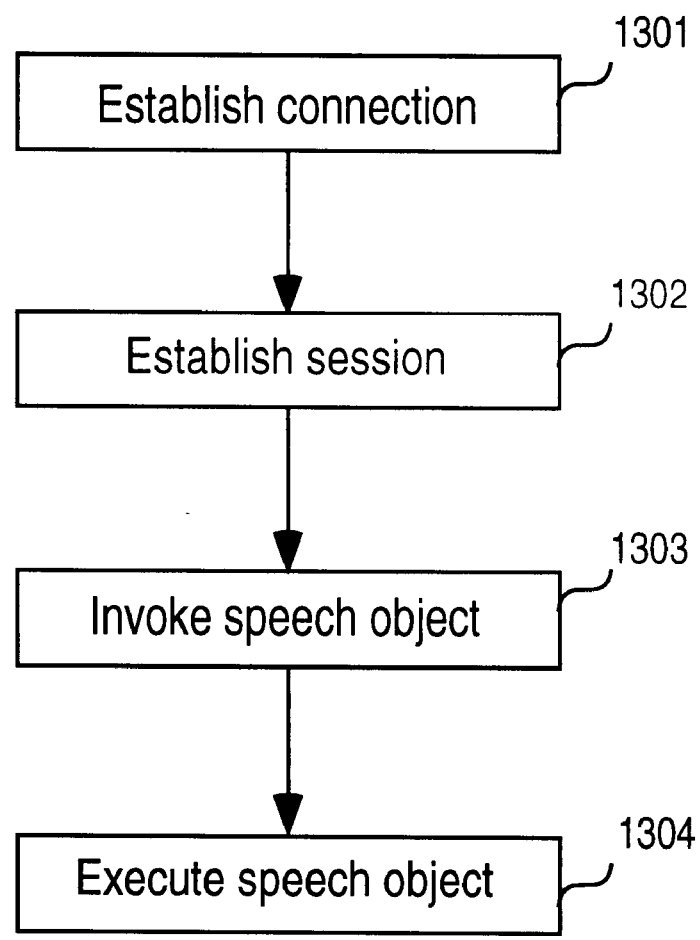
FIG. 13 shows a sequence of four operational phases associated with an embodiment according to FIG. 12.

In at least one embodiment, there are four phases associated with the SOP. As shown in FIG. 13, these phases are: 1) connection establishment, 2) session establishment, 3) invocation of a Speech Object, and 4) execution of the Speech Object (blocks 1301 through 1304, respectively).

1. Connection Establishment

Figure 15:
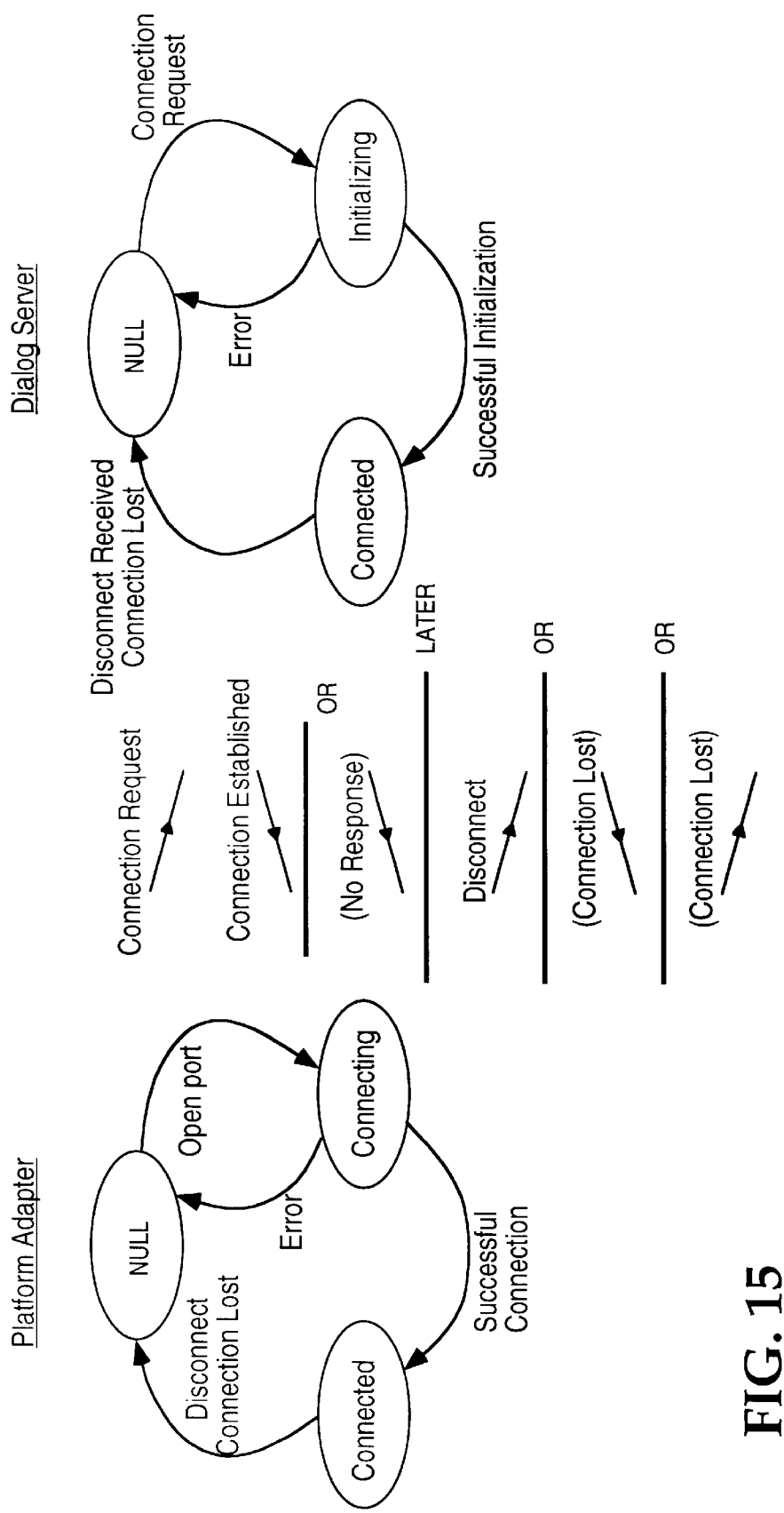
FIG. 15 is a state transition diagram of the connection establishment phase for an embodiment according to FIG. 12.

FIG. 15 is a state transition diagram of the connection establishment phase. FIGS. 15 through 18 show messages that are sent between the platform adapter 47 and the dialog server 49, with the dialog server 49 represented on the right and the platform adapter 47 represented on the left. FIGS. 15 through 18 are also time-sequenced starting from the top, so that a message shown above another is sent earlier in time. The horizontal bar with the word "OR" next to it indicates that the two messages above and below it are alternatives: only one of them is possible. The horizontal bar with the word "LATER" next to it indicates that the messages below it occur after a much later time, and do not immediately follow the ones above it. Parentheses "()" around an item denote that the item is not truly a message but is a placeholder to provide completeness in the set of events.

Thus, referring to FIG. 15, note first that a reset to any state-machine causes all lower-level state-machines to reset as well. Initially, an SOP connection is unestablished and all state-machines are NULL. When an application instance starts on the IVR platform 45, it must indicate to the platform adapter 47 that it wishes to use Speech Object services at some future time. This function may be accomplished with a "cell" (a step represented by a graphical object) on the IVR application generation tool. In response to this initialization call, the platform adapter establishes a TCP connection to the machine running the dialog server 49 and a known port. The dialog server 49, using standard socket semantics, accepts this connection and creates a new socket on its end, thus establishing a connection. At this point, both the platform adapter 47 in the dialog server 49 move to the "connected" states in their respective connection state machines. Hence, the next phase of SOP Protocol, session establishment, can begin. If a TCP connection was not established, then the connection state machinery sets to "null", and lower-level state machines stay at "null". Also, if any time the connection is lost, then the connection state machine and all lower-level state machines are reset to "null".

2. Session Establishment

Figure 16:
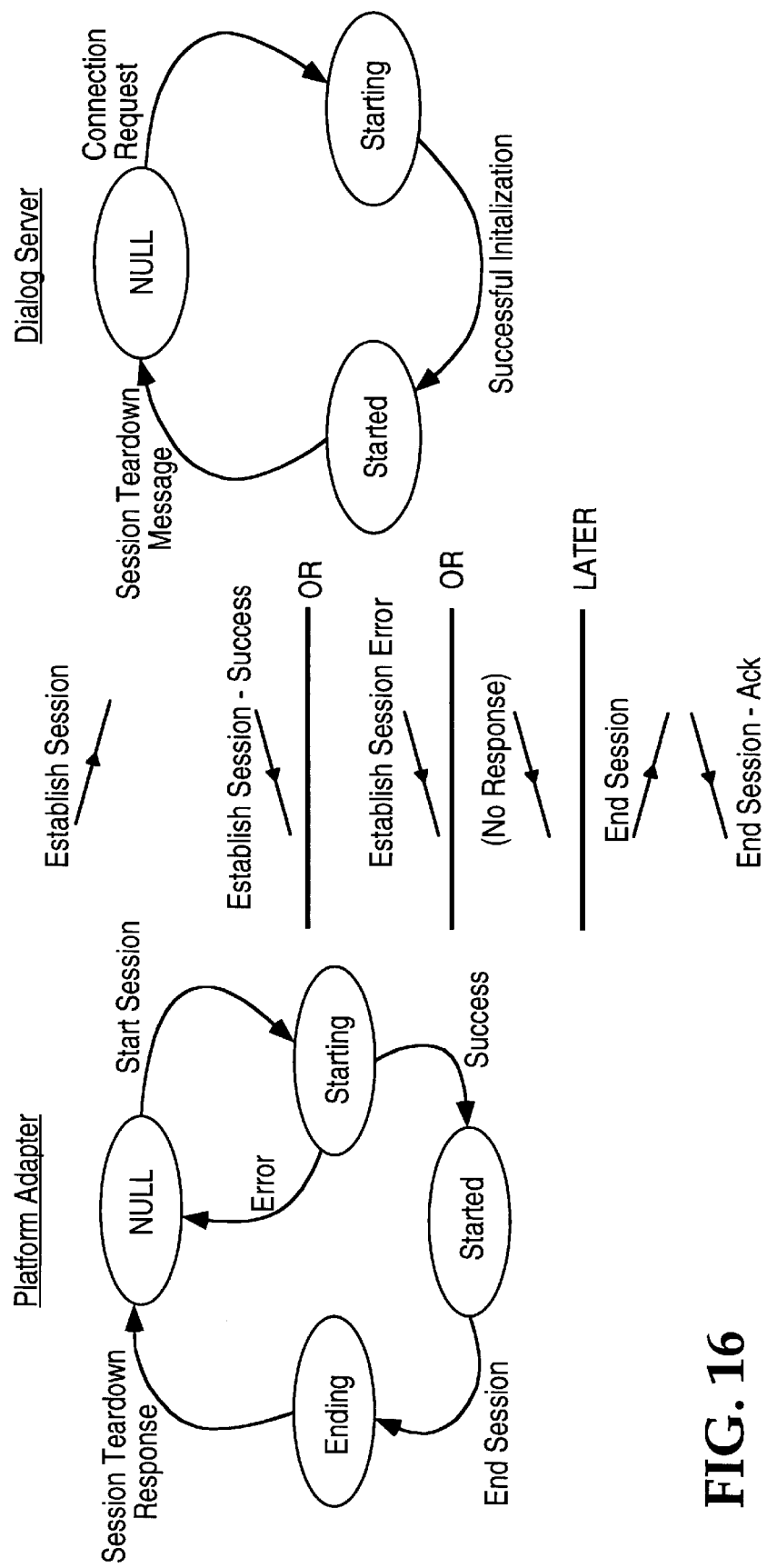
FIG. 16 is a state transition diagram of the session establishment phase for an embodiment according to FIG. 12.

Once a connection is established, the platform adapter 47 establishes a session with the dialog server. FIG. 16 is a state transition diagram of the session establishment phase. A session typically will correspond to the lifetime of the application instance on the platform. Generally, this corresponds to the lifetime of a telephone call for that application. However, a session can also be established on a different basis, such as for a particular channel (e.g., establishing a session when a channel is first opens and reusing a session across multiple calls, provided the application associated with that session is unchanged). The platform adapter 47 establishes the connection according to the protocol, by sending the version of the protocol it will speak, a list of the capabilities that the platform 45 can provide, and other initialization data. Messages in this phase and in all subsequent phases are in XML and sent as TCP data over the connection.

The dialog server 49 provides a session handle that uniquely identifies the session. The platform adapter 47 uses this handle for communications with the dialog server 49 in the future. This handle-based approach allows multiple platform adapter's to establish individual simultaneous sessions with the dialog server 49 on a single TCP socket. This model may be preferable to one in which each application instance establishes a TCP socket. However, preferably both models are supported by the dialog server 49, and it is up to the developer of the platform adapter 47 to decide which is more appropriate for that platform. Once the session is established, the cell that initialized the platform adapter 47 returns to the application instance that invoked it, with an appropriate status code that the platform adapter 47 returns. The application instance may decide what to do in case the platform adapter 47 was unsuccessful in initializing the session on the dialog server 49.

Referring to FIG. 16, the platform adapter 47 sends an Establish Session message to the dialog server 49 to initiate the session This message may be conformant with the following XML DTD fragment, for example:

<! ELEMENT session_init_message (version, (capability)*, napp_state_name?, app_id?)>

This fragment represents that a session_init_message consists of a version field; one or more capability fields; an optional napp_state_name field; and an optional app_id field. The version field contains the version of the protocol that is being used and the capability field specifies what capabilities the platform adapter 47 can offer. Examples of capabilities that may be specified are: recognition capability, barge-in capability, dynamic grammar capability, speaker enrollment capability, and speaker verification capability. Note that XML requires that these fields appear in the order of their definition in the DTD, which means that a message with the capability field first and the version field next is an invalid XML message and will fail parsing. In general, order is important to XML messages.

Each running application on the IVR platform 45 is also associated with an unique application identifier (ID), app_ID. Also, Speech Objects that the application 46 runs share a common object that is associated with this application which is used for storing data associated with this application, such as the locale of the application, etc. This object is derived from the AppState object, mentioned above. The Establish Session message specifies both the app_ID and the name of the shared object, napp_state_name, as shown in the DTD fragment above.

Thus, a platform adapter that supports only recognition and barge and capabilities may send the following XML message as its session_init_message to the dialog server 49:

```
<SOPDF_Message>
    <session_init_message>
        <version>1.0</version>
        <capability>RECOGNITION</capability>
        <capability>BARGE_IN</capability>
        <napp_state_name>foobar</ napp_state_name>
        <app_id>flifo</ app_id>
    </session_init_message>
</SOPDF_Message>
```

In response to the Establish Session message from the platform adapter 47, the dialog server 49 sends a response to the platform adapter 47 that tells the platform adapter 47: 1) what version it is using; 2) a session identifier, session_id, that forms the handle for all future messages for that session from this platform adapter; and, 3) a status indication indicating whether the dialog server 49 is willing to establish a session, or an error code if it is not. An example of a DTD fragment which may be used for this message is as follows:

<! ELEMENT session_init_response (version, session_id, status)>

An example of an XML response to a session_init_message which the dialog server 49 might send is:

```
<SOPDF_message>
    <session_init_response>
        <version>1.0</version>
        <session_id>handle_2944</session_id>
        <if status>NUANCE_OK</status>
    </session_init_response>
</SOFDF_Message>
```

Note that in this example, the string "handle_2944" is an example, and any meaning it contains is known only to the dialog server 49. The platform adapter 47 treats it as an opaque string handle.

3. Invocation

Once successfully initialized, the application instance perform other normal activities, such as answering the telephone and establishing database connections. When the application is ready to use a Speech Object, it invokes it through a special cell (also known as a step on some platforms) in the development environment, which is referred to as the "invocation cell" in the discussion below. The invocation cell's inputs will be the name of the Speech Object to be invoked, a blocking timeout value, and a set of parameters that are relevant to the Speech Object being invoked. These inputs to the object are determined by the Speech Object itself, and the allowed values are documented by that particular Speech Object.

In at least one embodiment, a Speech Object executing on the dialog server 49 expects a KVSet as its input, as described above. Platforms that can natively support such a structure should allow the invocation cell to contain it as input. However, for platforms that cannot support this flexibility, the KVSet can be specified as a flat key-value set. Under this approach, the hierarchical key namespace is transformed into flat strings delimited by periods. When this is done, keys become flat and somewhat longer, while values become purely strings, floats or ints. It then becomes the function of the platform adapter 47 to translate this flatter set into the SOPDF representation for transmission over the SOP to the dialog server 49. The invocation cell is blocking and returns either when an event occurs in the platform adapter 47 or the supplied timeout value has expired.

Figure 17:
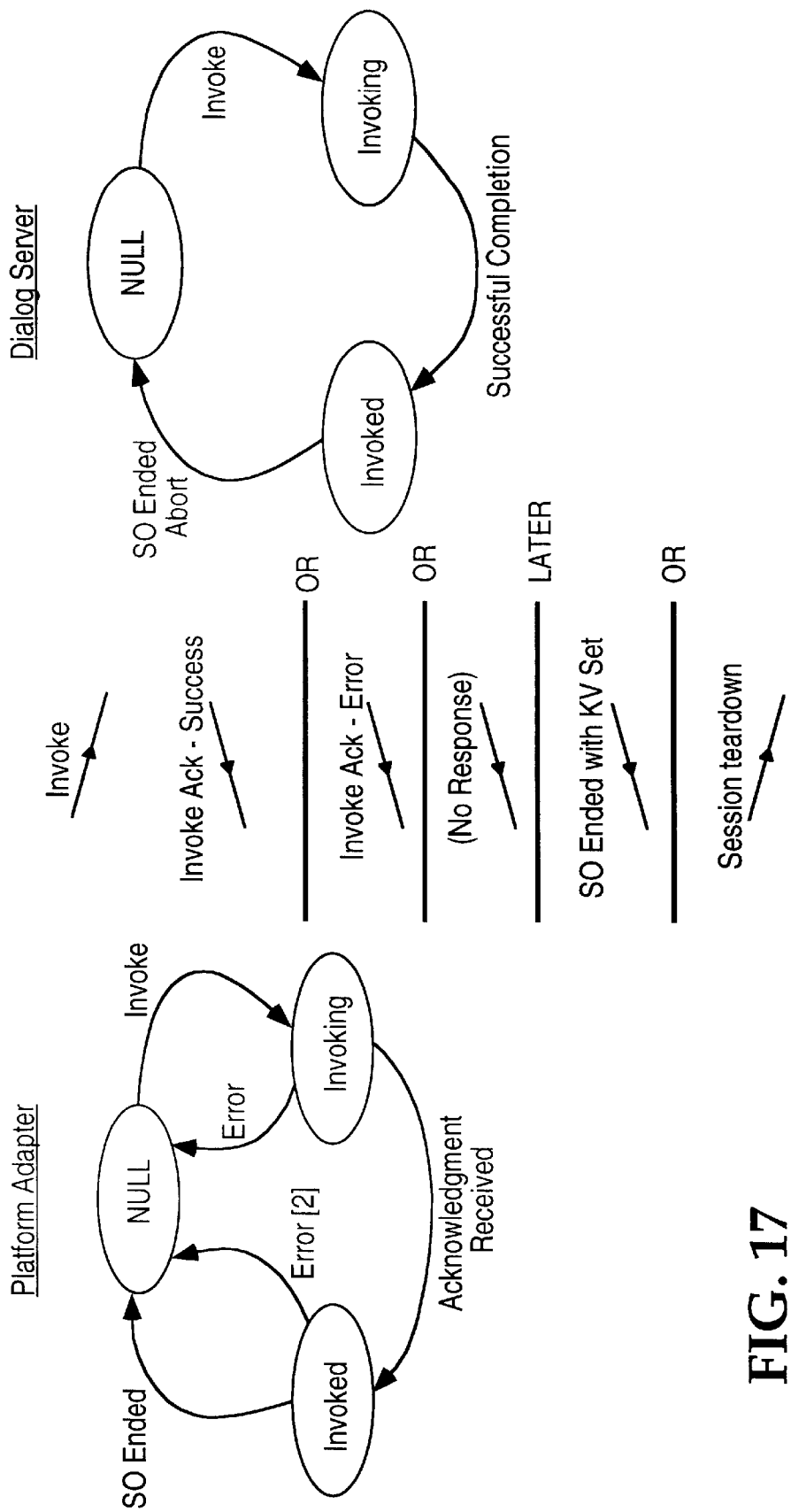
FIG. 17 is a state transition diagram of the invocation phase for an embodiment according to FIG. 12.

FIG. 17 is a state transition diagram associated with invoking a Speech Object on the dialog server 49. First, platform adapter 47 sends an Invoke message to the dialog server 49. An example of a DTD fragment which may be used for the invoke message is as follows:

<! ELEMENT so_invoke_message (session_id, so_name, (kv_set)*)>

The session_id field is filled with the handle that the dialog server 49 provided earlier, while the so_name is the name of the Speech Object that the platform adapter 47 is interested in using. The KVSet is described above.

An example of an so_invoke_message from the platform adapter 47 is:

```
<SOPDF_message>
    <so_invoke_message>
        <session_id>Adapt259 </session_id>
        <so_name>Date</so_name>
        <kv_set>
            <key>novice_user</key>
        to    <value>TRUE</value>
        </kv_set>
    </so_invoke_message>
</SOPDF_Message>
```

Normally, the dialog server 49 sends an Invoke Acknowledgement back to the platform adapter 47. An example so_invoke_response from the dialog server 49 is:

```
<SOPDF_message>
    <so_invoke_response>
        <session_id>Adapt259</session_id>
        <invocation_id n>1.0</invocation_id>
        <status>NUANCE_OK</status>
    </so_invoke response>
</SOPDF_Message>
```

At the end of invocation, when a Speech Object has finished execution, it returns a KVSet Object containing the results. The invocation can also end through an "abort" being sent from the platform adapter 47 or the dialog server 49.

4. Execution

Once a Speech Object has been invoked, the dialog server 49 functions as its proxy to request actions of platform adapter 47. Preferably, messages in this phase follow a strict request-response format, with each request guaranteed a response. The response contains a result field, which is used to convey the result of the request.

An example of the DTD fragment which specifies a message in the execution phase is as follows:

<! ELEMENT execution_message (session_id, invocation_id, (execution_id)?, ((request)+| (response)+))>

The execution_id field is optional and is used when request multiplexing is needed. This string identifier is generated by the dialog server 49 and sent with a request when it needs to use multiplexing. The platform adapter 47 is required to save this identifier and send it back when the corresponding response is being sent. This technique allows the dialog server 49 to disambiguate multiple command responses and more than one response is expected, i.e., when multiple simultaneous commands are executing.

Thus, an example of the DTD fragment that defines the request field is:

```
<!ELEMENT request(command, argument*)>
<!ELEMENT argument((prompt, grammar*)
                | parameter+
                | parameter_name+
                )>
<!ELEMENT prompt (prompt_atom)+>
<!ELEMENT parameter (parameter_name, parameter_type,
        parameter_value)>
```

An example of the DTD fragment that defines the response structure is:

<! ELEMENT response (command_result?, status)>
<! ELEMENT command_result (kv_set)>
<! ELEMENT status (status_atom)+>

Figure 18:
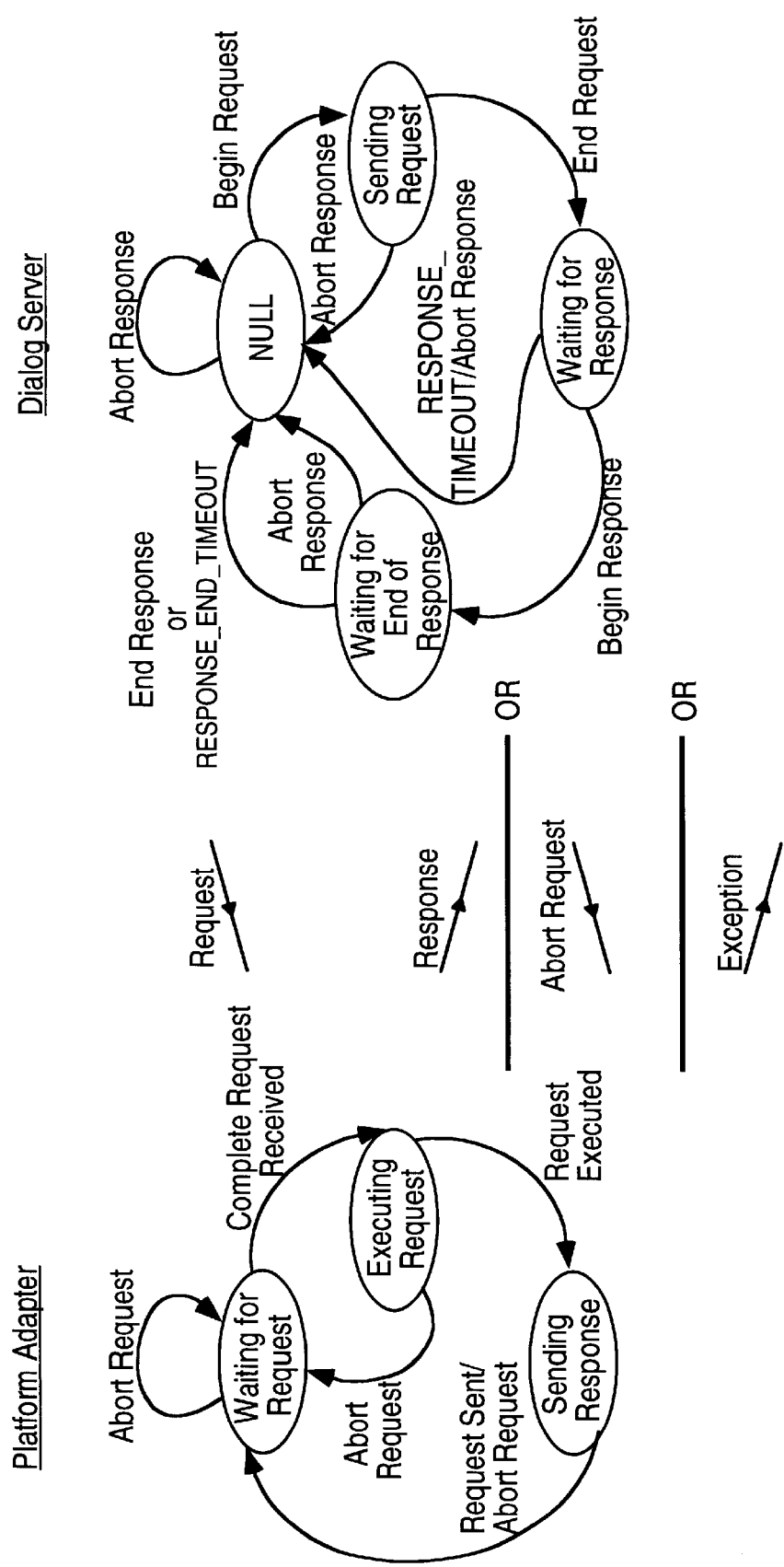
FIG. 18 is a state transition diagram of the execution phase for embodiment according to FIG. 12.
Figure 19:
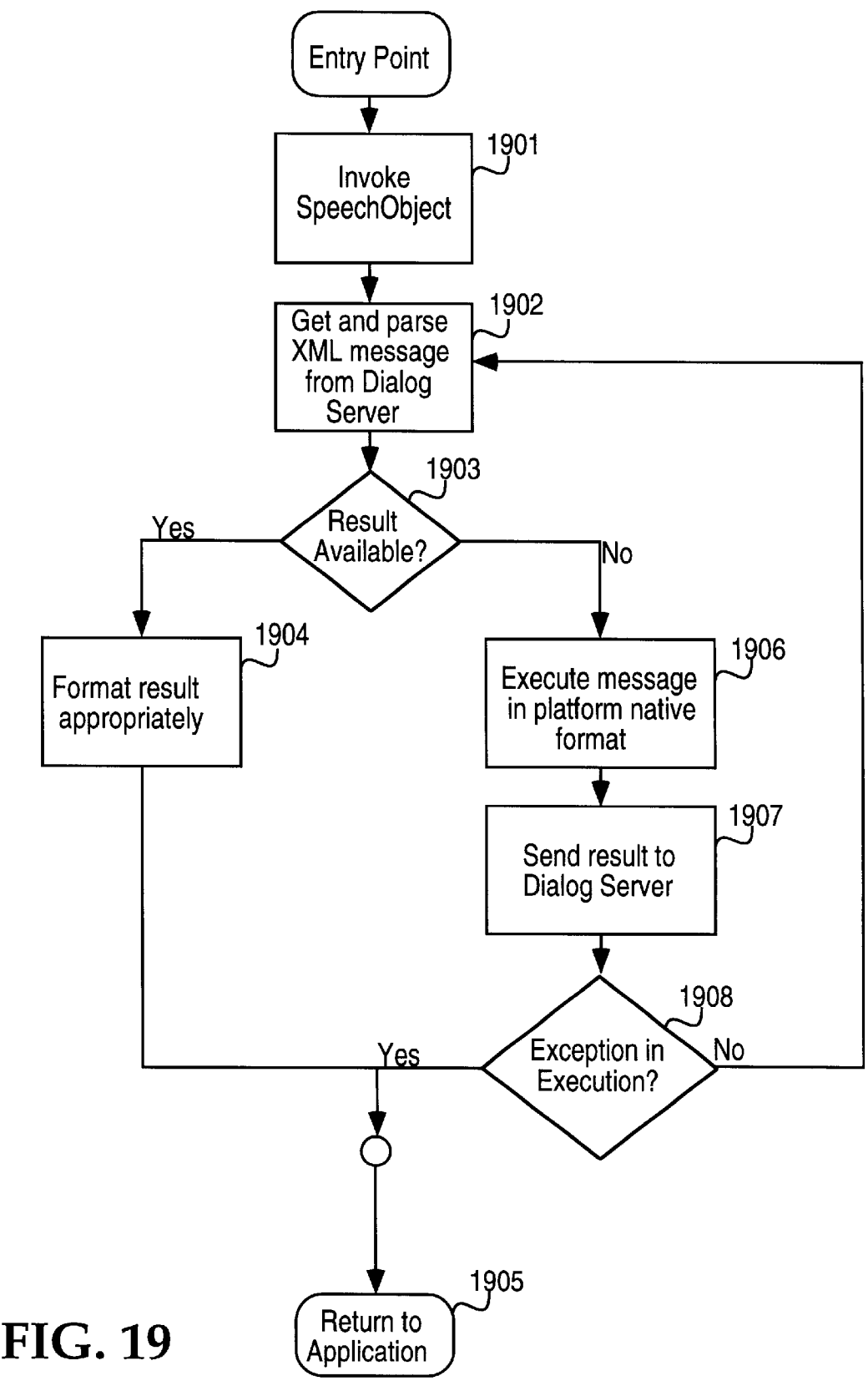
FIG. 19 is a flow diagram showing a routine which may be performed by the platform adapter when a Speech Object is invoked, for an embodiment according to FIG. 12.

FIG. 18 is a state transition diagram representing execution of the Speech Object. FIG. 19 is a flow diagram showing a routine which may be performed by the platform adapter 47 when a Speech Object is executed. Referring to FIG. 19, at block 1901, the platform adapter 47 sends the invocation message to the dialog server 49. The platform adapter 47 then loops, executing subcommands generated by the Speech Object until the Speech Object is done executing. More specifically, at 1902 the platform adapter 47 receives and parses an XML message from the dialog server 49. Such parsing can be performed using any of a number of open-source XML parsers, at least some of which are widely available on the Internet. If a result of executing the sub-commands is available at 1903, then at 1904 the platform adapter 47 formats the results appropriately and returns to the application at 1905. If a result is not yet available at 1903, then at 1906 the platform adapter 47 executes the appropriate message in the native format for the IVR platform based on the last subcommand. After executing such message, platform adapter 47 sends the results to the dialog server 49 at 1907. Next, if there is exception in execution at 1908, then routine returns to the application at 1905. Otherwise, the routine repeats from 1902.

The foregoing routine may be translated directly to the IVR platform's application generation environment, with the platform adapter 47 being a subroutine. More sophisticated implementations are, of course, possible. Such implementations might include, for example, those in which the messaging loop is integrated into the IVR's main scheduling loop, and the connections with the dialog server 49 are handled by the platform's connection engine.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of creating a device for defining a dialog interaction between a speaker and a speech recognition mechanism, the method comprising:

providing a set of properties associated with the dialog interaction and logic for using the set of properties to control the dialog interaction when executed in a processing system; and defining a class to include the set of properties and the logic, such that the class can be instantiated in the processing system as an object configured to control the dialog interaction, such that one or more sub-classes are definable based on the class, each subclass including properties inherited from the class, and such that the object can control the dialog interaction without the need for a dialog manager external to said object, wherein the object implements a predefined interface, such that the object and a plurality of other similarly constructed objects for controlling dialog interaction can be invoked using the predefined interface.

2. A method as recited in claim 1, wherein the object is configured to package results of the interaction into a playable object, such that when invoked, said playable object causes audio data representing the result to be played via an audio interface.

3. A method as recited in claim 1, wherein any subclass of said one or more subclasses may be defined as a specialization of said class.

4. A method as recited in claim 1, further comprising defining a subclass of the class, such that the subclass can be instantiated as an object in the processing system, including defining the subclass to include a second set of properties, the second set of properties including at least some of said set of properties and additional properties not part of said set of properties.

5. A method as recited in claim 1, wherein the set of properties comprises a set of prompts associated with the interaction.

6. A method as recited in claim 1, wherein the set of properties comprises a set of grammars associated with the interaction.

7. A method as recited in claim 1, wherein said defining comprises defining the class such that the object installs the set of grammars dynamically when invoked in the processing system.

8. A method as recited in claim 1, wherein the set of properties comprises a set of prompts and a set of grammars, each associated with the interaction.

9. A machine-readable storage medium having stored therein information for configuring an interactive voice response platform to perform an interaction with a speaker, the information comprising:

information representing a set of properties associated with the interaction;

logic for using the set of properties to control the interaction when the logic is executed in a processing system; and information defining the set of properties and the logic to be elements of a class that can be instantiated as a speech object in the processing system to control the interaction, such that one or more sub-classes are definable based on the class, each subclass including properties inherited from the class, and such that the speech object can control the dialog interaction without the need for a dialog manager external to the speech object, wherein the speech object implements a predefined interface by which the speech object and a plurality of other speech objects can be invoked.

10. A machine-readable storage medium as recited in claim 9, wherein said information representing the set of properties associated with the interaction comprises:

information representing a set of prompts associated with the interaction; and information representing a set of grammars associated with the interaction.

11. A machine-readable storage medium having stored therein information readable by a processing system, the information comprising information defining a class that can be instantiated as an object in a processing system to control a dialog interaction between a speaker and a speech recognition mechanism, the class having a set of properties associated with the dialog interaction and logic for using the set of properties to control the dialog interaction when the logic is executed, such that one or more sub-classes are definable based on the class, each subclass including properties inherited from the class, and such that the object can control the dialog interaction without the need for a dialog manager external to said object, wherein the object implements a predefined interface using which the object and a plurality of other similarly constructed objects for controlling dialog interaction can be invoked.

12. A method as recited in claim 11, wherein the set of properties comprises a set of prompts, a set of grammars, or both, each associated with the dialog interaction.

13. A method of creating a software component for defining interaction between a speaker and a speech recognition mechanism in an interactive voice response environment, the method comprising:

including first data in the software component, the first data representing a set of prompts that can be output to the speaker when the software component is invoked by a processing system;

including second data in the software component, the second data representing a set of grammars associated with the interaction;

including first code in the software component, the first code representing processing logic for controlling the interaction when executed by the processing system, based on the set of prompts and the set of grammars; and including second code in the software component, the second code for defining the software component as a first class that can be instantiated by the processing system as an object for controlling the interaction between the speaker and the speech recognition mechanism, such that the first class is extensible by definition of one or more subclasses of the first class, each said subclass inheriting properties of the first class, such that the object implements a predefined interface by which the object and a plurality of other similarly constructed objects can be invoked;

wherein the object can control the interaction without the need for a dialog manager external to said object.

14. A method as recited in claim 13, wherein said including second code comprises including the second code such that the first class can be combined with a second class to form a third class separate from the first class and the second class, such that the third class can be instantiated by the processing system as one or more objects.

15. A method of creating a device for defining an interaction between a speaker and a speech recognition mechanism, the method comprising:

providing information representing a first class in an interactive voice response environment, such that the first class can be instantiated as one or more objects in a processing system to control the interaction, such that one or more sub-classes are definable based on the class, each subclass including properties inherited from the class, and such that the object can control the dialog interaction without the need for a dialog manager external to said object, wherein the object implements a predefined interface by which the object and a plurality of other similarly constructed objects can be invoked; and using a computer system to define a second class as a specialization of the first class, the second class including a set of prompts associated with the interaction, a set of grammars associated with the interaction, and logic for using the set of prompts and the set of grammars when executed on the processing system to control the interaction between the speaker and the speech recognition mechanism, such that the second class can be instantiated as an object in the processing system to control the interaction.

16. A method as recited in claim 15, wherein said using a computer system to define the second class comprises defining the second class as a subclass of the first class.

17. A method as recited in claim 16, wherein the first class includes a first set of prompts and a first set of grammars, and wherein said using a computer system to define the second class further comprises:

defining the second class to include a second set of prompts, the second set of prompts including at least one prompt of said first set of prompts and a prompt that is not part of said set of prompts; and defining the second class to include a second set of grammars, the second set of grammars including at least one grammar of said first set of grammars and a grammar that is not part of said set of grammars.

18. A method of creating a compound device for defining an interaction between a speaker and a speech recognition mechanism, the method comprising:

selecting a plurality of classes, each of the plurality of classes defining operations for an interaction of a particular type between a speaker and a speech recognition mechanism in an interactive voice response environment, each of the plurality of classes having associated with it a set of prompts, a set of grammars, or both, and logic for using the set of prompts, the set of grammars, or both, to control an interaction between the speaker and the speech recognition mechanism when executed on a processing system, such that each of the plurality of classes can be instantiated as a speech object configured to control an interaction of the corresponding type, such that one or more sub-classes are definable based on each of the classes, each subclass including properties inherited from the corresponding class, and such that each speech object can control the dialog interaction without the need for a dialog manager external to said speech object, wherein each speech object implements an interface common to all of the speech objects; and using a computer system to define a compound speech object class for use in the interactive voice response environment, such that the compound speech object class, when instantiated in a processing system as a compound speech object, encapsulates the speech objects representing said selected plurality of classes, the compound speech object having logic for executing the speech objects in a specified order during the interaction with the speaker.

19. A method as recited in claim 18, further comprising using the computer system to define the compound class, such that the compound speech object further encapsulates a processing object separate from the plurality of speech objects, the processing object providing processing logic.

20. A method as recited in claim 19, further comprising using the computer system to define the compound class such that a first one of the plurality of speech objects encapsulated in said compound speech object encapsulates a plurality of additional speech objects, such that said first one of the plurality of speech objects is also a compound speech object.

21. An interactive voice response (IVR) system comprising:

a speech recognition unit;

an audio interface configured to communicate audio information with a speaker; and an IVR platform coupled to the speech recognition unit and to the audio interface, the IVR platform including a speech-enabled application; and a speech object invocable in response to the application to control a particular type of audio interaction with the speaker, wherein the speech object is an instantiation of a class, the class having a set of properties associated with a corresponding type of interaction and logic for using the set of properties to control an interaction of said type when the logic is executed, such that one or more sub-classes are definable by a user based on the class, each subclass including properties inherited from the class, and such that the speech object controls the interaction with the speaker without the need for a dialog manager external to the speech object, wherein the speech object implements a predefined interface using which a plurality of similarly constructed speech objects can be invoked.

22. An IVR system as recited in claim 21, wherein each said subclass is a customized speech object including properties inherited from said class.

23. An IVR system as recited in claim 21, wherein the set of properties associated with the interaction comprises a set of prompts associated with the interaction.

24. An IVR system as recited in claim 21, wherein the set of properties associated with the interaction comprises a set of grammars associated with the interaction.

25. An IVR system as recited in claim 21, further comprising a speech channel object providing the IVR with access to the audio interface and the speech recognition unit, wherein the speech channel object is an instantiation of a speech channel class.

26. An IVR system as recited in claim 21, wherein the audio interface comprises a telephony interface.

27. An IVR system as recited in claim 26, wherein the audio interface comprises an Internet Protocol (IP) based interface.

28. An interactive voice response (IVR) system comprising:

interface means for communicating audio information with a speaker;

recognition means for performing speech recognition on a portion of the audio information that is received from the speaker;

means for executing a speech-enabled application, including means for requesting an interaction with the speaker to acquire said portion of the audio information; and means for invoking a speech object to control the interaction, wherein the speech object is an instantiation of a class, the class having a set of properties associated with the interaction and logic for using the set of properties to control the interaction when the logic is executed, such that one or more sub-classes can be defined based on the class, each subclass including properties inherited from the class, such that the speech object can control the dialog interaction without the need for a dialog manager external to the speech object, wherein the speech object implements a predefined interface by which the speech object and a plurality of other speech objects can be invoked.

29. An IVR system as recited in claim 28, wherein each said subclass represents a customized speech object including properties inherited from the class.

30. An IVR system as recited in claim 28, wherein the set of properties associated with the interaction comprises a set of prompts associated with the interaction.

31. An IVR system as recited in claim 28, wherein the set of properties associated with the interaction comprises a set of grammars associated with the interaction.

32. An IVR system as recited in claim 28, further comprising means for providing the IVR with access to the interface means and the recognition means by invoking a speech channel object as an instantiation of a speech channel class.

33. An IVR system as recited in claim 28, wherein the audio interface comprises a telephony interface.

34. An IVR system as recited in claim 33, wherein the audio interface comprises an Internet Protocol (IP) based interface.

35. A device for configuring a processing system for acquisition of information from a speaker in an interactive voice response (IVR) environment, the device comprising:

a machine-readable storage medium; and information stored in the machine-readable storage medium, the information defining a class for use in the IVR environment, such that the class can be instantiated in the IVR environment as a compound object encapsulating a plurality of objects, each of the plurality of objects for configuring the IVR environment to acquire a particular type of information from the speaker during an interaction with the speaker, each of the plurality of objects invocable in a specified order during the interaction, wherein one or more sub-classes are definable based on the class, each subclass including properties inherited from the class, wherein the compound object can control the dialog interaction without the need for a dialog manager external to the compound object, and wherein the compound object implements a predefined interface by which the compound object and a plurality of other objects can be invoked.

36. A device as recited in claim 35, wherein the information comprises, for each of the plurality of objects:

information representing a set of properties associated with the interaction;

logic for using the set of properties to control the interaction when the logic is executed in a processing system; and information defining the set of properties and the logic to be elements of a user-extensible class.

37. A device as recited in claim 36, wherein said information representing the set of properties associated with the interaction comprises:

information representing a set of prompts associated with the interaction; and information representing a set of grammars associated with the interaction.

38. A device as recited in claim 35, wherein said stored information is such that the compound speech object further encapsulates a processing object separate from the plurality of objects, the processing object having processing logic.

39. A device as recited in claim 35, wherein said stored information is such that a first one of the plurality of objects encapsulated in the compound speech object encapsulates a plurality of additional speech objects.

* * * * *